United States Patent
Pronk

(10) Patent No.: US 11,223,946 B2
(45) Date of Patent: Jan. 11, 2022

(54) GUARANTEEING AUTHENTICITY AND INTEGRITY IN SIGNALING EXCHANGE BETWEEN MOBILE NETWORKS

(71) Applicant: Koninklijke KPN N.V., Rotterdam (NL)

(72) Inventor: Ewout Leonard Pronk, Zoetermeer (NL)

(73) Assignee: KONINKLIJKE KPN N.V., Rotterdam (NL)

( * ) Notice: Subject to any disclaimer, the term of this patent is extended or adjusted under 35 U.S.C. 154(b) by 46 days.

(21) Appl. No.: 16/486,152

(22) PCT Filed: Jan. 19, 2018

(86) PCT No.: PCT/EP2018/051304
§ 371 (c)(1),
(2) Date: Aug. 14, 2019

(87) PCT Pub. No.: WO2018/138006
PCT Pub. Date: Aug. 2, 2018

(65) Prior Publication Data
US 2020/0267542 A1 Aug. 20, 2020

Related U.S. Application Data

(60) Provisional application No. 62/450,333, filed on Jan. 25, 2017.

(30) Foreign Application Priority Data

Jul. 12, 2017 (EP) .................................... 17180968

(51) Int. Cl.
*H04W 12/037* (2021.01)
*H04L 9/08* (2006.01)
(Continued)

(52) U.S. Cl.
CPC ......... *H04W 12/037* (2021.01); *H04L 9/0825* (2013.01); *H04L 9/3226* (2013.01);
(Continued)

(58) Field of Classification Search
CPC .... H04W 12/037; H04W 8/12; H04L 9/0825; H04L 9/3226; H04L 9/3242; H04L 9/3247; H04L 9/3297; H04L 9/0643
See application file for complete search history.

(56) References Cited

U.S. PATENT DOCUMENTS 9,830,214 B1 * 11/2017 McGinn .............. G06F 11/0709
2002/0066011 A1 * 5/2002 Vialen ................. H04W 12/121
713/150

(Continued)

FOREIGN PATENT DOCUMENTS

WO WO 2008/064153 A1 5/2008

OTHER PUBLICATIONS

Tairov et al., "Signaling Messages and AVPs for 3P-AAA framework", 2011, Fifth International Conference on Next Generation Mobile Applications and Services, pp. 180-184. (Year: 2011).*

(Continued)

*Primary Examiner* — Matthew Smithers
(74) *Attorney, Agent, or Firm* — Hamilton, Brook, Smith & Reynolds, P.C.

(57) ABSTRACT

Embodiments of the present disclosure provide a solution that guarantees authenticity and integrity on the signaling exchange between mobile roaming networks that trust each other. According to at least one example embodiment, a network element located on a sending mobile network may be configured to generate a signaling message that includes one or more protected data fields, calculate a hash value for each of the one or more protected data fields, combine each of the calculated hash values together using an exclusive OR (Continued)

(XOR) operation resulting in a combined hash value. The network element may be further configured to calculate an authentication code based on the combined hash value and a key, add an authentication field to the signaling message, the authentication field storing the authentication code, and send the signaling message to a transporting network.

7 Claims, 21 Drawing Sheets

(51) Int. Cl.
*H04L 9/32* (2006.01)
*H04W 8/12* (2009.01)
(52) U.S. Cl.
CPC .......... *H04L 9/3242* (2013.01); *H04L 9/3247* (2013.01); *H04L 9/3297* (2013.01); *H04W 8/12* (2013.01)

(56) References Cited

U.S. PATENT DOCUMENTS

| | | | |
|---|---|---|---|
| 2003/0041242 A1* | 2/2003 | Patel .................... | H04L 9/3242 713/170 |
| 2005/0033960 A1* | 2/2005 | Vialen .................. | H04L 63/123 713/170 |
| 2009/0077104 A1* | 3/2009 | Sheets ................... | G06F 21/64 |
| 2011/0320803 A1* | 12/2011 | Hampel ................. | H04L 9/0863 713/150 |
| 2012/0124381 A1 | 5/2012 | Kim | |
| 2012/0225679 A1* | 9/2012 | McCann ............ | H04L 65/1016 455/466 |
| 2012/0260328 A1* | 10/2012 | Ravindranath ..... | H04L 61/2575 726/9 |
| 2012/0284523 A1* | 11/2012 | Kolesnikov ........... | H04L 9/0643 713/181 |
| 2014/0056306 A1* | 2/2014 | Kolesnikov ........... | H04L 9/3242 370/393 |
| 2016/0050073 A1* | 2/2016 | Kolesnikov ........... | H04L 9/0643 713/181 |
| 2016/0165432 A1* | 6/2016 | Dubesset ................ | H04W 4/14 455/433 |
| 2017/0012824 A1* | 1/2017 | Goyal ................... | H04L 45/304 |
| 2017/0318570 A1* | 11/2017 | Shaw ..................... | G06F 9/5005 |
| 2018/0332051 A1* | 11/2018 | Diachina ............. | H04W 12/106 |
| 2019/0239071 A1* | 8/2019 | Krishnan .............. | H04W 12/76 |
| 2020/0127864 A1* | 4/2020 | Norberg .............. | H04M 15/785 |

OTHER PUBLICATIONS

Sherwood, J., et al., "Enterprise Security Architecture," A Business-Driven Approach, Computer Securities, (2005).
Digital Signature Standard (DSS) Federal Information Processing Standards Publication 186-4 (Jul. 2013).
GSM Association: LTE and EPC Roaming Guidelines Version 14.0, Feb. 10, 2016, XP055434546, Retrieved from the Internet: URL: https://www.gsma.com/newsroom/wp-content/uploads//IR.88-v14.04.pdf [retrieved on Dec. 12, 2017].
Bhanu Teja E Kotte, "Analysis and Experimental Verification of Diameter Attacks in Long Term Evolution Networks," Dec. 1, 2008, XP055434736, Stockholm Sweden, Retrieved from the Internet: URL: http://www.diva-portal.org/smash/get/diva2:951619/FULLTEXT01.pdf [retrieved on Dec. 13, 2017].
Extended European Search Report for in EP Application 17180968.4, dated Dec. 22, 2017.
International Search Report and Written Opinion for International Application No. PCT/EP2018/051304, dated Mar. 3, 2018.
International Preliminary Report on Patentability for International Application No. PCT/EP2018/051304, dated Jul. 30, 2019.

\* cited by examiner

3GPP-Protected AVP =
00 00 05 13                // Network Indicator 1151a
00                         // Algorithm = SHA-256
C7 88 E2 4E                // MAC (truncated) 1151b
57 DE 5F 82                // Timestamp 1151c
00                         // Action is 'adding' 1151d
00 00 04 08 00 00 05 7A    // AVP codes of protected AVPs 1151e

FIG. 12A

3GPP-Protected-AVP =
00 00 07 BB                // Network Indicator 1152a
00                         // Algorithm = SHA-256
85 9B 61 70                // MAC (truncated) 1152b
57 DE 5F 82                // Timestamp 1152c
01                         // Action is 'modification' 1152d
00 00 04 08                // AVP that is modified 1152e

FIG. 12B

```
-------- AVP code 1401 1401 Terminal-Information
11000000 AVP flags 192 0xc0
1-------- Vendor-Specific 1 Set
-1------- Mandatory 1 Set
--0------ Protected 0 Not set
---0----- Reserved 0 Not set
----0---- Reserved 0 Not set
-----0--- Reserved 0 Not set
------0-- Reserved 0 Not set
-------0- Reserved 0 Not set
--------0 Reserved 0 Not set
-------- AVP length 56
-------- AVP vendor id 10415 3GPP (10415)
-------- Terminal-Information ...

-------- AVP code 1402 1402 IMEI
11000000 AVP flags 192 0xc0
1-------- Vendor-Specific 1 Set
-1------- Mandatory 1 Set
--0------ Protected 0 Not set
---0----- Reserved 0 Not set
----0---- Reserved 0 Not set
-----0--- Reserved 0 Not set
------0-- Reserved 0 Not set
-------0- Reserved 0 Not set
--------0 Reserved 0 Not set
-------- AVP length 27
-------- AVP vendor id 10415 3GPP (10415)
-------- IMEI 3560260502XXXX -------- AVP code 1403 1403 Software-Version
11000000 AVP flags 192 0xc0
1-------- Vendor-Specific 1 Set
-1------- Mandatory 1 Set
--0------ Protected 0 Not set
---0----- Reserved 0 Not set
----0---- Reserved 0 Not set
-----0--- Reserved 0 Not set
------0-- Reserved 0 Not set
-------0- Reserved 0 Not set
--------0 Reserved 0 Not set
-------- AVP length 14
-------- AVP vendor id 10415 3GPP (10415)
-------- Software-Version 12337 01

-------- AVP code 1032 1032 RAT-Type
11000000 AVP flags 192 0xc0
1-------- Vendor-Specific 1 Set
-1------- Mandatory 1 Set
--0------ Protected 0 Not set
---0----- Reserved 0 Not set
----0---- Reserved 0 Not set
-----0--- Reserved 0 Not set
------0-- Reserved 0 Not set
-------0- Reserved 0 Not set
--------0 Reserved 0 Not set
-------- AVP length 16
-------- AVP vendor id 10415 3GPP (10415)
-------- RAT-Type 1004 EUTRAN (1004)
```

FIG. 16

GUARANTEEING AUTHENTICITY AND INTEGRITY IN SIGNALING EXCHANGE BETWEEN MOBILE NETWORKS

This application is the U.S. National Stage of International Application No. PCT/EP2018/051304, filed Jan. 19, 2018, which designates the U.S., published in English, and claims priority under 35 U.S.C. § 119 or 365(c) to Europe Application No. 17180968.4, filed Jul. 12, 2017, which claims the benefit of U.S. Provisional Application No. 62/450,333, filed Jan. 25, 2017. The entire teachings of the above applications are incorporated herein by reference.

FIELD OF THE INVENTION

The invention relates to a system for sending signaling messages to a transporting network.

The invention also relates to a system for modifying signaling messages by a transporting network.

The invention also relates to a system for authenticating signaling messages on a receiving network.

BACKGROUND

Today, the use of mobile telephony is embedded into society as a whole. The system that was primarily deployed in well developed countries has now become a global affair. Roaming is one of the pillars of the modern mobile telephony system. Due to standardization efforts, roaming is possible on a global scale, although minor differences between handsets and network deployments vary from country to country. In mobile networks, signaling messages are vital for the functioning of the network. Signaling messages make sure that subscribers have mobility management in order to receive Short Message Service (SMS) texts and calls, set up Internet (data) sessions, get billed properly, etcetera. The dominant protocol that served this goal for decades was Signaling System No. 7 or simply "SS7" or "C7." However, the SS7 network was not designed to have a high level of security. This lack of security became an issue when entities other than mobile network operators and carriers, such as Mobile Virtual Network Operators (MVNOs) and other third parties gained access to the SS7 network. The mobile industry has responded, and the Global System for Mobile Communication Association (GSMA) is working with its members on prevention and mitigation measures.

However, SS7 is not the signaling protocol that is used in the fourth generation of wireless mobile telecommunications technology (4G), also called the Long Term Evolution (LTE) standard Instead, LTE networks utilize Diameter signaling protocol. Diameter signaling protocol is also the intended protocol for the fifth generation wireless mobile telecommunications technology (5G), which has not yet been implemented.

SUMMARY

The Diameter signaling protocol has several advantages over SS7, for instance, message size and the flexibility to create proprietary fields. On the other hand, Diameter signaling protocol has even more security challenges than SS7. Unlike SS7, the Diameter signaling protocol is a hop-by-hop protocol where intermediate nodes in the routing of a message are stateful. This implies that a Diameter response always follows the same path (in reverse) as the Diameter request. This makes the protocol extremely vulnerable to spoofing. In SS7, the spoofing problem was limited to a modification action where the response would get lost In contrast, a spoofed message in Diameter always gets rewarded with an answer.

Recent studies on vulnerabilities of the Internetwork Packet Exchange (IPX) ecosystem have shown that the biggest security challenge in the signaling exchange between mobile network operators lies in the lack of end-to-end integrity and authenticity. Numerous definitions for integrity and authenticity in the context of cyber security exist. In most cases authenticity is considered as part of integrity. For the purposes of the present disclosure authenticity is about being able to verify the sender of the message, and integrity is about being able to check whether unauthorized modification of the message took place during transit. These definitions highlight two different problems, each requiring a solution in relation to the IPX ecosystem.

Authenticity and integrity are a problem in Diameter signaling protocol, because of the hop-by-hop nature of the Diameter protocol that provides opportunities for spoofing. In other words, it is hard, if not impossible, for mobile network operators to determine upon receiving a Diameter signaling message if the message was sent from the entity the message appears to be sent from. Further, it is also impossible for a mobile network operator to determine that the message has not been changed in transit. The reason behind this is that the IPX network and its exchange is largely built on trust. A trust based concept was inherited from the SS7 network, but has been proven to be insufficient. The IPX network is not as closed or private as it was originally intended. For instance, the General Packet Radio Service Roaming eXchange (GRX) network (that is related to and sometimes integrated with the IPX network) has nodes that are accessible from the Internet. Furthermore, it is hard to keep control of at the networks that have access to the IPX network.

Due to the way the roaming signaling exchange is constructed, ensuring a signaling message's authenticity and integrity is complex. Solutions to these issues that are available for IP networks, such as the Internet, are not workable in the roaming signaling exchange. For example, end-to-end encryption between two mobile networks is, in most cases, not possible due to operational and economic constraints.

In the IPX ecosystem, routing based on IP address is commonly used to route a Diameter message to the next Diameter "hop" and not to the end destination. Each hop may read and modify parts of the Diameter message along the way. This makes ensuring the Diameter message's integrity challenging, because some fields in the Diameter application layer may be changed and others not.

Another challenge is that IPX providers (who make up the IPX network interconnecting mobile networks) also provide services for mobile network operators, such as steering of roaming, and fraud prevention and detection. From this perspective IPX providers may change fields in the Diameter message without this necessarily being an integrity problem.

Security problems within mobile networks are not new, but one may argue that security challenges of the IPX ecosystem are actually problems on a scale that they require attention. There are a number of factors why this problem today is more relevant than ever. First, society is more and more dependent on mobile telephony and mobile Internet access. Mobile data traffic is growing exponentially and the usage of roaming is facing it fastest growth ever due to globalization and regulations like the EU "roam-like-at-home" regulation. Second, Diameter is not a legacy protocol. It is the signaling protocol for the current LTE (4G) network and for the future 5G network. Third, because of the growing importance of mobile networks the interest of threat actors is growing, from hackers to fraudsters, and even nation states. Fourth, because the valuable assets of the mobile ecosystem (e.g., tracking subscribers' locations, making free cal, intercepting calls, among others assets) are within the reach of attackers if one has access to the mobile signaling exchange. These factors in combination with virtually every person owning and using a mobile phone, including politicians and top targets for intelligence services, leaves substantial risks unaddressed. Yet, the IPX ecosystem/network is largely built on trust. No hard proof of integrity and authenticity is furnished upon receiving a Diameter signaling message from the international IPX signaling network.

The solution to these security issues should be technically, operationally and economically feasible. This means that the solution should work technically, with the current protocols and with an acceptable performance and minimum overhead to the existing protocol. The operational impact should also be limited, with the solution providing preventive and automated measures with minimum impact to existing elements and processes in mobile roaming agreements.

Embodiments of the present disclosure provide a solution that guarantees authenticity and integrity on the signaling exchange between mobile roaming networks that trust each other. A trusted mobile operator in this context is an operator that can reasonably be expected to send only legitimate traffic, and does not host evil entities behind the trusted realm. Embodiments of the present disclosure are also able to provide detection of legitimate and illegitimate changes to Attribute-Value Pairs (AVPs) message fields in a Diameter protocol message.

According to at least one example embodiment, the present disclosure may be implemented in the form of a method or corresponding apparatus for generating a Diameter signaling message which may be authenticated by a receiving mobile network. The at least one example embodiment includes a network element located on a sending mobile network, the network element configured to generate a signaling message that includes one or more protected data fields, calculate a hash value for each of the one or more protected data fields, and combine each of the calculated hash values together using an exclusive OR (XOR) operation resulting in a combined hash value. The network element may be further configured to calculate an authentication code based on the combined hash value and a key, add an authentication field storing the authentication code to the signaling message, and send the signaling message to a transporting network for transit to a receiving mobile network.

According to the at least one example embodiment, the sending mobile network may be a mobile network providing LTE or 5G data service to a roaming mobile device and the transporting network may be an IPX provider (or a plurality of interconnected IPX provisers) that communicatively couples the sending mobile network to a receiving mobile network.

In some embodiments, the network element may be a diameter routing agent, a diameter edge agent, or any other network element located on the sending mobile network capable of generating or modifying the signaling message.

According to some embodiments, the signaling message is a Diameter protocol message. In some embodiments, the key may be a private symmetric key shared with a receiving mobile network, and the authentication field may further include an indication of the sending mobile network. The indication of the sending mobile network may alert the receiving mobile network to the correct private key that is shared with the sending mobile network.

According to some embodiments, the key may be an asymmetric key that is associated with a public key and a private key. For example, the key may be a digital signature that has a private key which only the sending mobile network has access to, and a public key that a transporting network or the receiving mobile network may access to confirm the message was created by the sending mobile network using the private key.

In some embodiments, the network element may be further configured to append a timestamp to the combined hash value and calculate the authentication code based on the combined hash value with the appended timestamp and the key. Additionally, the authentication field may further include the timestamp, and/or an indication of each of the one or more protected data fields.

According to at least one other example embodiment, a network element located on a transporting mobile network may be configured to receive a signaling message that includes one or more protected data fields and a first authentication field including a first authentication code. In some embodiments, the network element may be further configured to calculate a hash value for each of the one or more protected data fields, select at least one of the calculated hash values, and combine each of the selected calculated hash values and the first authentication code together using an exclusive OR (XOR) operation resulting in a combined value. In some embodiments, the network element may be further configured to calculate a second authentication code based on the combined value and a key, add a second authentication field including the second authentication code to the signaling message, and send the signaling message to a receiving network.

According to some embodiments, the transporting mobile network may be an IPX provider that communicatively couples mobile networks in order to provide LTE or 5G data services to roaming mobile subscribers.

According to some embodiments, the network element may be further configured to append a timestamp to the combined value and calculate the second authentication code based on the combined value with the appended timestamp and the key. In some embodiments, the second authentication field may further include the timestamp.

According to some embodiments, the network element may be further configured to add at least one protected data field to the one or more protected data fields before calculating the hash values for each of the one or more protected data fields. In some embodiments, the network element may be further configured to delete at least one of the one or more protected data fields in the signaling message, and combine each of the calculated hash values that were not previously selected and the second authentication code together using a XOR operation resulting in a second combined value. According to another aspect of this embodiment, the added second authentication field may include the second combined value instead of the second authentication code.

According to some embodiments, the network element may be further configured to modify at least one of the one or more protected data fields, combine each of the calculated hash values that were not selected and the second authentication code together using a XOR operation resulting in a second combined value. According to another aspect of this embodiment, the added second authentication field may include the second combined value instead of the second authentication code.

According to at least one other example embodiment, a network element located on a receiving mobile network may be configured to receive a signaling message that includes one or more protected data fields and an original authentication field including an original authentication code. In some embodiments, the network element may be further configured to calculate a hash value for each of the one or more protected data fields, select at least one of the calculated hash values, and combine each of the selected calculated hash values together using an exclusive OR (XOR) operation resulting in a combined selected hash value. In some embodiments, the network element is further configured to calculate a confirmation authentication code based on the combined selected hash value and a key associated with a sending mobile network, and authenticate the received signaling message by comparing the confirmation authentication code to the original authentication code.

According to some embodiments, the receiving mobile network and the sending mobile network may be mobile networks providing LTE or 5G data service to a roaming mobile device. Additionally, the network element may be a diameter routing agent or a diameter edge agent.

According to some embodiments, the received signaling message may further include an added authentication field including an added authentication code. Additionally, the network element may be further configured to (before combining each of the selected calculated hash values together) combine all of calculated hash values and the original authentication code together using an exclusive OR (XOR) operation resulting in a combined hash value, calculate a second confirmation authentication code based on the combined hash value and a key associated with a transporting network, and compare the second confirmation authentication code with the added authentication code. In some embodiments, the selected hash values are selected based on an indication of one or more protected data fields stored in the original authentication field. In some embodiments, the added authentication field was added to the diameter message by the transporting network, the transporting network being an IPX provider that communicatively couples mobile networks in order to provide LTE or 5G data services to roaming mobile subscribers.

According to at least one other example embodiment, a network element located on a receiving mobile network may be configured to receive a signaling message that includes one or more protected data fields and an original authentication field, the original authentication field including an original authentication code, and an added authentication field, the added authentication field including an added authentication code. The network element may be further configured to calculate a hash value for each of the one or more protected data fields, combine all of calculated hash values and the original authentication code together using an exclusive OR (XOR) operation resulting in a combined hash value, and calculate a first confirmation authentication code based on the combined selected hash value and a key associated with a transporting mobile network.

According to another aspect of the example embodiment, the network element may be further configured to solve for a previous hash value, the previous hash value being a result of a XOR operation between the first confirmation authentication code and the added authentication code. The network element may be further configured to select at least one of the calculated hash values, combine each of the selected calculated hash values and the previous hash value together using an exclusive OR (XOR) operation resulting in a combined selected hash value, calculate a second confirmation authentication code based on the combined selected hash value and a key associated with a sending mobile network, and authenticate the received signaling message by comparing the second confirmation authentication code to the original authentication code.

In some embodiments, the network element may be further configured to append a timestamp to the combined hash value and calculate the confirmation authentication code based on the combined hash value with the appended timestamp and the key. Additionally, the original authentication field may further include the timestamp.

According to another aspect of the example embodiment, the selected hash values are selected based on an indication of one or more protected data fields stored in the original authentication field.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 68 illustrates an example of an attacker gaining access to a IPX network through an IPX provider by impersonating a visited mobile network.

FIG. 78 is a flow chart illustrating an example method/process a sending mobile network may use to protect the integrity and authencity of a Diameter signaling protocol message.

FIG. 12A and FIG. 12B show an example 3GPP-Protected-AVP, excluding the header, flags and length field.

FIG. 16 shows example AVPs with mandatory fields from an "Update Location Request" Diameter signaling protocol message.

DETAILED DESCRIPTION

A description of example embodiments of the invention follows.

Figure 1:
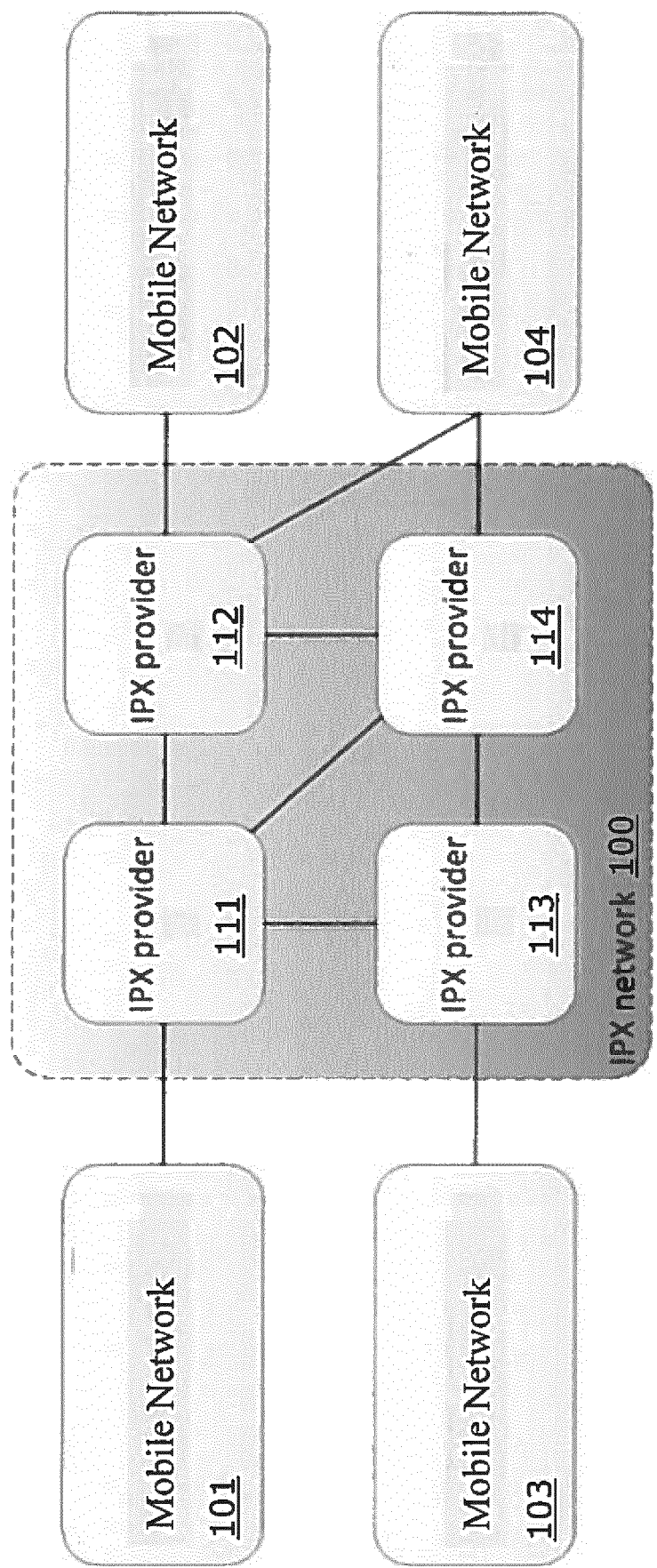
FIG. 1 illustrates a typical IPX network with IPX providers connecting mobile network operators to each other.
Figure 2:
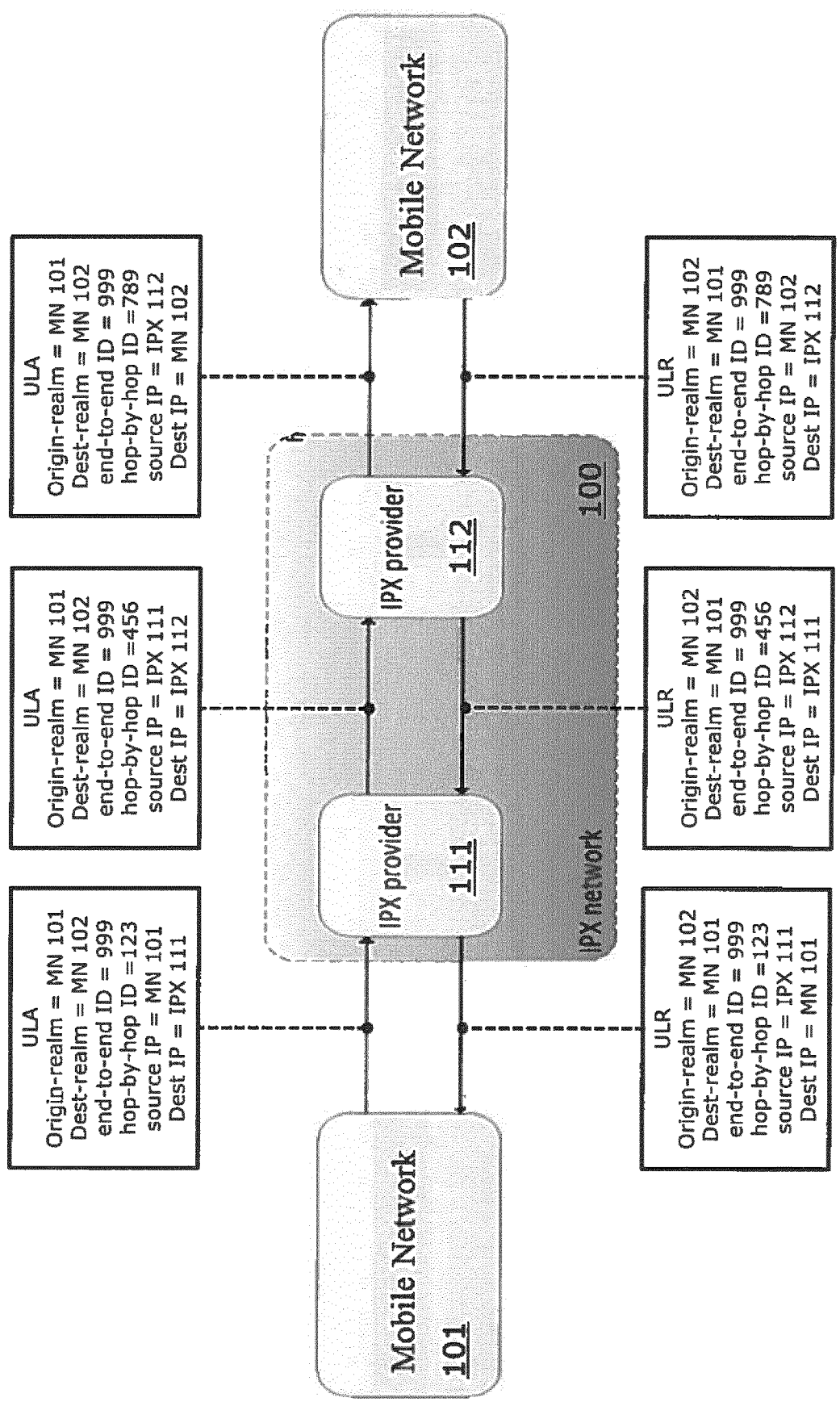
FIG. 2 illustrates an example Diameter signaling protocol message routing concept.

Embodiments of the present disclosure provide a solution that guarantees authenticity and integrity on the signaling exchange between mobile networks that trust each other. The GSMA is an organizing body that sets both standards and guidelines for the mobile industry including the signaling exchange between mobile networks (I.e., the IPX network). FIG. 1 illustrates a typical IPX network with IPX providers connecting mobile network operators to each other, which collectively is the IPX ecosystem. How the ecosystem operates is explained thoroughly in Permanent Reference Document of the GSMA, "LTE and EPC Roaming Guidelines," Version 14.0, Feb. 10, 2016, herein incorporated in its entirety by reference. The LTE and EPC Roaming Guidelines are "non-binding," which means that mobile network operators and IPX providers can refer to this as the standard, however an exact implementation according to the document is not mandatory. The GSMA proposes two different models to secure IPX Diameter traffic on the signaling exchange. The first is an architecture where Diameter traffic (i.e., Diameter signaling messages) is tunneled hop-by-hop between Diameter-aware nodes. The sending mobile network tunnels the traffic to an IPX provider, the IPX provider tunnels the traffic to the next IPX provider, and the last IPX provider tunnels the traffic to the receiving mobile network. FIG. 2 illustrates an example of the hop-by-hop Diameter traffic model. In this proposed model, authenticity, integrity and confidentiality are provided on a hop-by-hop basis. In practice, the hop-by-hop model has a number of different implementations, but many of the interconnections in the ecosystem remain unencrypted. At least one reason for leaving the interconnections unencrypted is that the monitoring system is running on probes, and the probes need to have unencrypted access to the Diameter protocol messages.

The second model the GSMA proposes is the end-to-end model where traffic is tunneled via a secure connection from the point of egress at the sending mobile network until being received at the point of ingress at the receiving mobile network. The secure connection may be, for instance, an IPsec connection between the two Diameter edge agents of the two different mobile networks. Authenticity, integrity and confidentiality between mobile networks is guaranteed in this model provided the usage of standard secure protocols and a flawless key management procedure.

However, the end-to-end model has almost no practical implementations. The operational impact is substantial since an average mobile network operator would have to have hundreds of roaming agreements and would need to implement a secure tunnel for each roaming agreement partner. Maintainability and time pressure are an issue. Launching new roaming partners is often under heavy time pressure due to commercial reasons (the bigger the roaming footprint, the higher the revenue for both inbound and outbound roaming).

Moreover, this second model leaves the IPX network to become only an IPX transport network that delivers IP traffic on a private network connection. This is the opposite of what the GSMA and IPX providers intended with the IPX network. Besides mere transport, IPX providers can provide additional services to mobile network operators, including steering of roaming traffic, roaming brokerage/hub, and fraud prevention/detection. Also, IPX providers can provide Quality of Service features to certain service streams. For instance, IPX providers have the ability to prioritize signaling traffic over voice traffic. Implementing the end-to-end model would foreclose on these extra services that IPX providers can offer.

Technically, the end-to-end secured Diameter signaling model between mobile roaming operators is the most secure model to guarantee authenticity and integrity between mobile roaming operators that mutually trust each other. Operationally however, it is unfeasible to maintain hundreds of secure tunnels between mobile roaming operators. Moreover, it pushes the IPX providers out of business or at least degrades them to a simple IPX transport function on a private network connection.

Presently, a mobile network operator has only two main ways to provide authenticity and integrity. First is to screen Diameter messages as a preventive measure, but the only field that a mobile network operator can reasonably detect something odd is the route-record field. Second is to screen Diameter messages as a repressive measure. This measure requires effort in detecting and analyzing possible intrusions. In sum, mobile network operators have little means to judge the authenticity and integrity of a Diameter signaling message.

As outlined above, there are a number of security issues within the IPX ecosystem concerning message authenticity and integrity. Mobile networks have a limited capacity to guarantee authenticity and integrity amongst themselves. Presently, the IPX providers together are mainly responsible for authenticity and integrity measures, but the effectiveness of these measures is out of control of the mobile network operators.

Digital signaling exchange between mobile networks providing service to a roaming mobile subscriber is done via an IP eXchange (IPX) network. This is an IP network interconnecting the IPX providers where each mobile network utilizes one or more IPX providers. The IPX network provides the Diameter signaling exchange between mobile networks. Signaling messages exchanged on the IPX network include authentication messages (to authenticate a visiting subscriber via its home network), location update messages (to download the profile of the subscriber into the visited network), requests for a subscribers location for executing a service and online charging messages to charge a prepaid subscriber, among others.

The IPX ecosystem consists of mobile network operators and IPX providers in the context of LTE (or 5G) roaming signaling. FIG. 1 shows a typical IPX network 100 with IPX providers 111-114 connecting mobile network operators 101-104 to each other. Not all IPX providers are necessarily connected to each other, and mobile network operators are usually connected to one or sometimes more IPX providers. According to a roaming agreement between two mobile network operators, a path is agreed upon where the Diameter signaling messages are exchanged between mobile network operators. The path is often fixed and due to the hop-by-hop nature of the Diameter signaling protocol, the Diameter response always follows the same path (of course, in reverse) as the Diameter request.

FIG. 2 shows the Diameter signaling routing concept by illustrating an example flow of an "Update Location Request" (ULR) Diameter message and "Update Location Answer" (ULA) Diameter message. Together, the exchange of messages is called a Diameter transaction between Mobile Network 101 and Mobile Network 102. The messages are labeled with end-to-end IDs and hop-by-hop IDs.

The operator (e.g., Mobile Network 102 as shown in FIG. 2) that initiates the Diameter request (ULR) sets both the Originating-Realm (MN-102) and Destination-Realm (MN-101) in the Diameter message and routes the message based on the Destination-Realm through the IPX network 100. The Destination-Realm is constructed based on the subscribers SIM identity, the International Mobile Subscriber Identity (IMSI).

The Diameter message has an end-to-end ID (999) that is, as the name says, unique for the entire Diameter transaction. To avoid collisions the message also has a hop-by-hop ID that is unique in each connection between Diameter-aware nodes. In this particular example we distinguish three unique hop-by-hop IDs (123, 456 and 789). The sender of the Diameter request (ULR), in this case Mobile Network 102 determines the end-to-end ID (999) for the transaction and it determines the hop-by-hop ID (123) for the first hop. The combination of the end-to-end ID and the hop-by-hop ID becomes the unique identifier of the transaction for each Diameter-aware node. Upon receiving, both IPX provider 111 and IPX provider 112 repeat this process. When Mobile Network 101 responds to the request, routing of the Diameter response (ULA) is not done on Destination-Realm but on the stored end-to-end ID and hop-by-hop ID in the database. It implies that all nodes In Diameter routing within the IPX network 100 must be stateful.

The Diameter base protocol is intended to provide an Authentication, Authorization and Accounting (AAA) framework. The base protocol runs on Transmission Control Protocol (TCP) or on Stream Control Transmission Protocol (SCTP), the latter provides better redundancy and continuity measures. On top of the base protocol several applications can run. This includes the applications in 3$^{rd}$ Generation Partnership Project (3GPP) systems that are used in LTE (or 5G) roaming signaling exchange.

The base protocol is mainly used for muting and error handling purposes. The previously discussed Origin-Realm and Destination-Realm are part of this base protocol. Diameter messages consist of Attribute-Value Pairs (AVPs), basically the fields in the Diameter messages. Both mandatory and optional AVPs belong to the base protocol. The same goes for the applications running on top of the base protocol. The protocol has the flexibility to add proprietary AVPs between applications and often the order to the AVPs is irrelevant for the application. An example of the structure of AVPs can be found in FIG. 16.

End-to-end routing within the IPX network 100 is not done on the IP layer but on the Diameter base protocol by means of the Destination-Realm in the request and by means of the hop-by-hop routing ID for the response. In the IPX network 100 a mix of private and public IP addresses can be used and usage of the Network Address Translation (NAT) protocol is uncommon.

Figure 3:
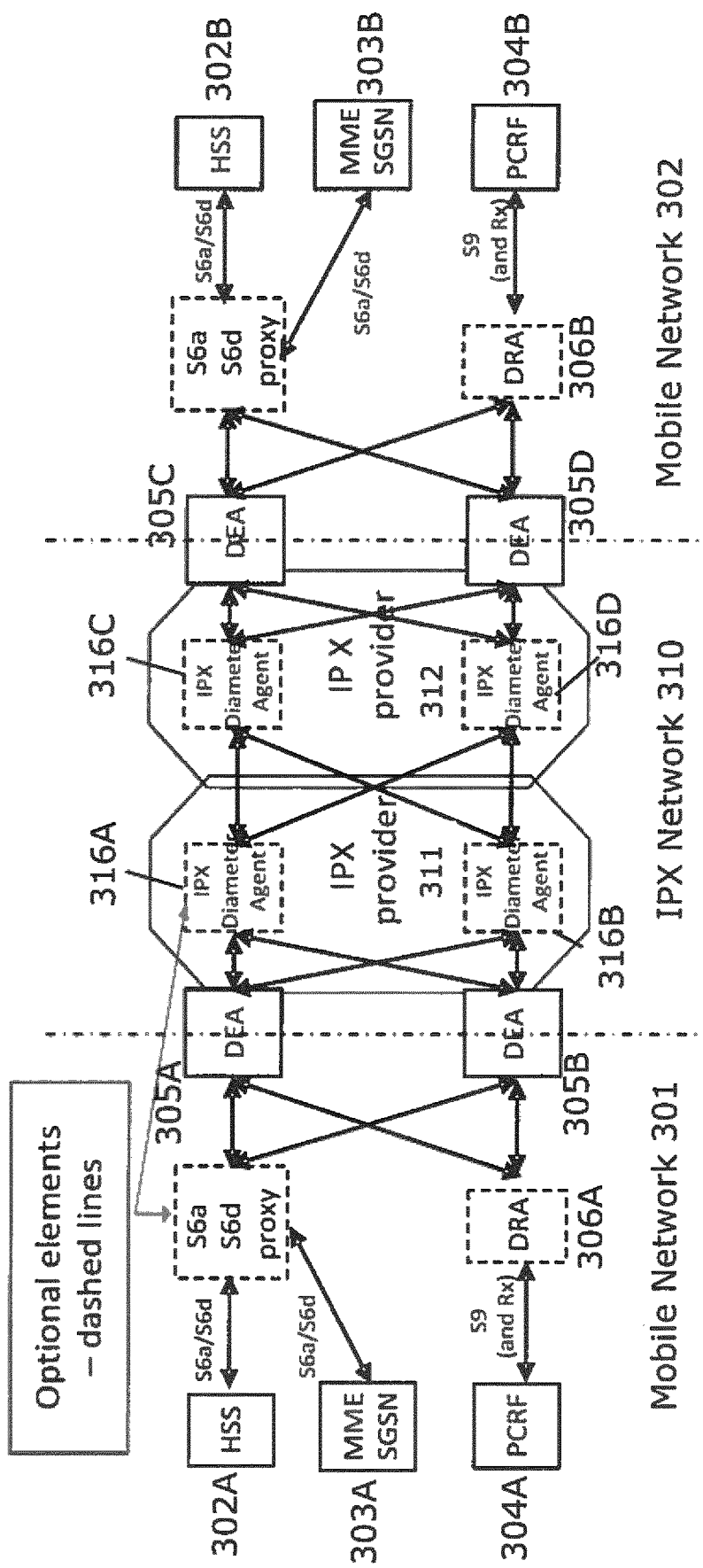
FIG. 3 illustrates the key network elements in an IPX ecosystem.

FIG. 3 illustrates the key network elements in an IPX ecosystem 300. The typical 3GPP nodes that deal with Diameter traffic in the IPX ecosystem 300 in relation to LTE roaming signaling exchange are the Home Subscriber server (HSS) (e.g., 302A and 302B), the Mobility Management Entity (MME) (e.g., 303A and 303B), the Policy and Charging Rules Function (PCRF) (e.g., 304A and 304B), The Diameter Edge Agent (DEA) (e.g., 305A-305D) and the Diameter Routing Agent (DRA) (e.g., 306A and 306B).

HSS 302A and HSS 302B are the subscriber databases of Mobile Network 301 and Mobile Network 302, respectively, each containing authentication information and primary information to identify subscribers. This information includes IMSIs and Mobile Subscriber ISDN Numbers (MSISDNs) (i.e., numbers that uniquely identify a subscription in a mobile network) of the mobile subscribers. Each HSS 302A and 302B further contains other settings like call barrings and service identifiers. A call barring is a telephone service feature that restricts certain types of outgoing calls (e.g., international calls) and/or incoming calls (e.g., calls from undesirable callers). MME 303A and MME 303B are the nodes of each serving network (i.e., Mobile Network 301 and Mobile Network 302) that contain a limited set of the HSS information of connected subscribers and are responsible for authentication and mobility management of the connected subscribers. PCRF 304A and PCRF 304B are responsible for the policies that a subscriber has, for instance on which Internet bundles the subscriber possesses and the approved Internet speed of his subscription. The DEAs 305A-305D could be considered as the firewall of the Diameter message exchange on the edge of each network. The DEAs 305A-305D are capable of screening messages and can take efforts to hide the topology of the network that could leak from the Diameter application layer.

DRA 306A and DRA 306B are transfer points for Diameter messages within a Mobile Network. A Mobile Network has often multiple MMEs and HSSs and a star topology simplifies the network over a fully meshed network. For practical reasons DRAs and DEAs are often co-located.

DRAs 316A-316D are also part of the topology of IPX provider 311 and IPX provider 312. The DRA of an IPX provider ensures that other mobile networks can be reached, either directly or via another IPX provider. In this case the node is named an IPX Diameter agent but in practice the node is not fundamentally different from a DRA in a Mobile Network.

In order to understand the shortcomings of IPX security and to better understand the need of guaranteeing authenticity and integrity, the stakeholders, assets, threat actors and attack vectors of the IPX ecosystem are examined below.

Mobile operators are the main stakeholders of the IPX ecosystem, because the goal of the IPX exchange is to exchange roaming signaling information between mobile network operators. For the masons explained above, mobile network operators do not connect and exchange signaling information directly.

IPX providers are the core of the IPX ecosystem. Mobile network operators have one or more IPX providers where all their International signaling exchange is processed. IPX providers strive to interconnect as many mobile network operators as possible for commercial reasons. An IPX provider also wants to achieve peering relationships with as many other IPX providers as possible in order to optimize their routing. The more peerings an IPX provider has, the better the IPX provider can supply reliable and fast interconnection to their mobile network operator customers. Both mobile network operators and IPX providers rely on vendors for their network equipment. The most notable network elements are delivered by the vendors for the IPX ecosystem are explained above with reference to FIG. 3.

Two stakeholders that do not play a direct role in the signaling exchange, but who are vital for the IPX ecosystem, are the GSMA and the mobile network customer. The GSMA represents the interests of mobile network operators worldwide, uniting nearly 800 operators and more than 250 other companies in the broader mobile ecosystem, including handset and device makers, software companies, equipment providers and Internet companies, as well as organizations in adjacent industry sectors. It is important to highlight that although IPX providers are part of the IPX ecosystem, the GSMA only represents the interest of mobile operators worldwide. In order to do so the GSMA is running a number of long term programs to keep the core business of mobile operators relevant. The GSMA also has a number of working groups, from management to technical level, to make sure that operators keep their relevance. For instance, by developing new services for the mobile industry, and providing a standard way to interoperate among operators and carriers. The latter is of great importance for roaming, and one of the major advantages for mobile operators compared to over-the-top services.

The mobile network customer is also an important stakeholder in the IPX ecosystem. The mobile network customer is the reason the ecosystem exists, and it is the customers' assets the threat actors are after.

Subscriber (i.e., mobile network customer) information resides inside the home mobile network, and part of that information is exchanged while subscribers roam on another (visited) mobile network. When a subscriber roams on a visited network, their information is transmitted from the home mobile network to the visited mobile network. This reveals information about the subscriber including, but not limited to: MSISDN, IMSI and the location of the subscriber. More information about the subscriber that is not part of the initial location update procedure can be both legitimately and illegitimately extracted from the HSS, the PCRF or the MME. This information could reveal what kind of product service bundles the subscriber is using, how much of that bundle is spent, the detailed location of the subscriber, whether the subscriber is busy/idle and authentication information. For a mobile service, where it can be reasonably expected that subscribers carry their phone wherever they go, the location of the handset/mobile device and therefore the subscriber is a key asset of mobile networks within the IPX ecosystem.

In SS7 protocol user content is an asset, this includes metadata of voice calls, SMS, etcetera. In contrast, Diameter protocol limits its scope to mobile data, where actual user content is not sent via the Diameter protocol. However, Diameter protocol may be used to prepare a subsequent attack to intercept actual user traffic.

The functioning of the mobile network is a key asset of the mobile network operators and the mobile network operators have the interest in keeping their networks functioning. Threat actors could target a mobile network, a group of subscribers, or single subscriber for an attack.

There are a number of threat actors that have an interest in the assets mentioned above. By doing a threat landscape analysis the assets can be linked to threat actors and attack vectors. The full analysis based on the SABSA framework is described in J. Sherwood, A. Clark, and D. Lynas, "Enterprise security architecture," *Comput. Secur.,* 2005 (incorporated herein by reference). A summarization of the analysis is presented below.

Ethical hackers have become more and more interested in mobile networks. This clearly can be observed by the growing number of publications on this subject In most cases ethical hackers take a cautious approach by first informing the mobile network operators and/or the GSMA well in advance before publications. A reason for their interest is that there is simply not that much research done in this area. Ethical hackers sometimes have the opportunity to test their findings in case they are allowed to do research behind a legitimate operator, using their access to the SS7 and Diameter network.

Nation states and their intelligence services have a goal to gain valuable information about individuals and companies for both defensive and offensive purposes. The Operation Socialist on Belgacom is an example of where a nation state managed to gain access to valuable information. Although for that specific hack the roaming signaling exchange was not specifically mentioned, it is not unrealistic that this could be a valuable target for nation states. After all, subscriber information including real-time location information is one of the assets of a mobile operator that can be targeted via the IPX exchange. With access to the IPX network, a DoS attack on a network or (a group of) subscriber(s) is an option. Nation states could also reside behind mobile network operators.

Commercial parties have shown their prevailing interest in mobile networks and their valuable assets in the context of cyber security. The most common example of doing so comes from the SS7 world where commercial parties have managed to get access to the SS7 network. Often the commercial party buys access from a mobile network operator for a legitimate goal but is using it for an illegitimate purpose. The main assets of interest for commercial parties are gaining subscriber information and location, for instance for building a database of valid MSISDNs and corresponding IMSIs for reselling. Note that commercial use of subscriber information is not prohibited by default. As an example, determining the location of a customer that initiates a foreign transaction with his credit card could be a legitimate goal. In all cases the mobile operator providing access must be aware of legitimate goals, as well as the mobile customer behind the subscription.

Fraudsters have a long history of abusing mobile networks. This is particularly true for fraud related to voice calls. Voice minutes to international destinations can be resold and so it is easier to cash-out compared to mobile data traffic.

An insider threat is a substantial risk in any environment, and the IPX ecosystem is no different. However, insider threats could be linked to the previous mentioned categories where nation states and fraud are the most common.

For the threat actors described above there are three common attack approaches: eavesdropping on a signaling exchange between mobile networks, executing a DoS attack, or a man-in-the-middle attack compromising the integrity the IPX network and injecting messages into the IPX network with the goal to gain subscriber information.

In the case of an attacker eavesdropping on a signaling exchange between mobile networks, the attacker is able to gain access to signaling flows within the IPX exchange. This could, for instance, be done when the attacker gains access to IPX network nodes (DRA/DEA), core routers, or a signaling monitoring system at a mobile network operator or a signaling carrier. An eavesdropping attacker can only access a limited amount of assets. For example, the attacker can obtain subscriber information or information about network topology which are outlined below.

Figure 4:
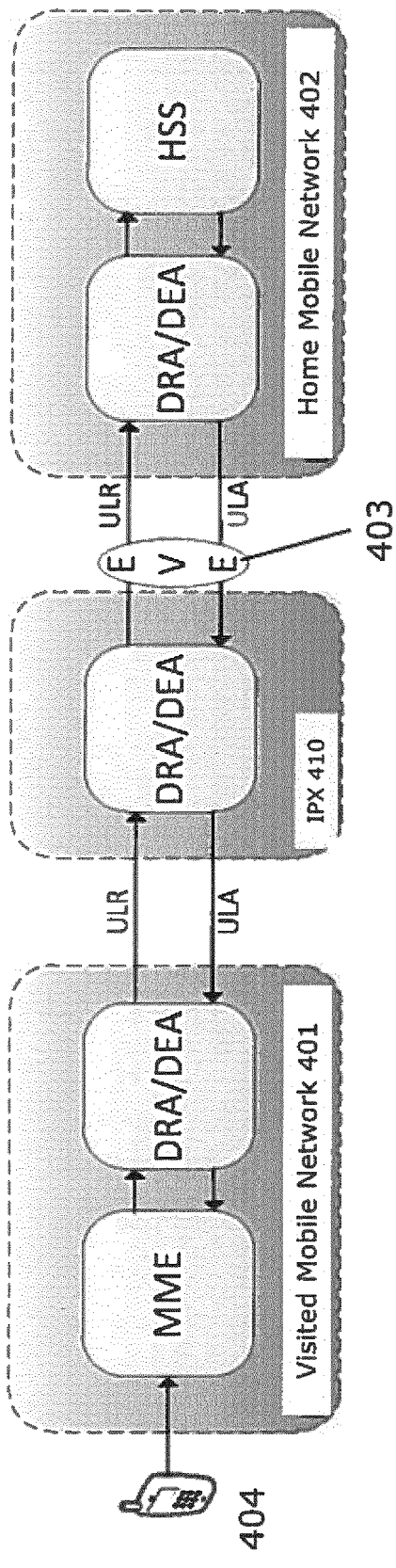
FIG. 4 illustrates an example eavesdropping attack used to gain subscriber information and location.

FIG. 4 illustrates an example eavesdropping attack used to gain subscriber information and location. As shown in FIG. 4, the eavesdropper 403 is listening into the Diameter traffic flows through the IPX provider 410 and between a visited mobile network 401 and home mobile network 402. As stated above, Diameter signaling traffic is often sent unencrypted, which makes it easy for the eavesdropper to monitor the traffic.

When a mobile network subscriber 404 wants to (re) register into a serving network (visited mobile network 401), an update location procedure is initiated. The serving mobile network (visited mobile network 401) requests access for the mobile subscriber with a Diameter "Update Location Request" (ULR), home mobile network 402 grants the access by responding with a "Update Location Accept" (ULA), and (re)downloads the subscriber settings and barrings into the serving network (visited mobile network 401). This procedure is chosen as an example, simply because it contains the most subscriber information from the existing procedures in Diameter signaling exchange between mobile network operators.

If the eavesdropper 403 intercepts an ULR of the mobile subscriber 404 from the home mobile network 402 while the mobile subscriber 404 roams on visited mobile network 401, the subscriber information as shown in Table 1 can be intercepted:

TABLE 1

Subscriber assets collected in a Diameter ULR message
Update Location Request

| Subscriber information | Description |
| --- | --- |
| IMSI | Unique identifier stored onthe sim card and home HSS |
| IMEI | Serial number of the mobile phone. Vendor lookup possible |
| Software-Version | The software version of the mobile phone |
| Origin-Realm | epc.mncXXX.mccXXX.3gppnetwork.org reveals the visited network |
| Destination-Realm | epc.mncXXX.mccXXX.3gppnetwork.org reveals the home network (could also be obtained from the IMSI) |
| RAT-Type | Reveals if the subscriber resides in the 2G, 3G or in the 4G network |

If the eavesdropper 403 also intercepts the corresponding ULA the information shown in Table 2 can be collected.

TABLE 2

Subscriber assets collected in a Diameter ULA message
Update Location Accept (not including what has been
obtained already in the request)

| Subscriber information | Description |
| --- | --- |
| MSISDN | The mobile phone number |
| Max-Requested-Bandwidth | The allowed bandwidth by the home network to the visited network |
| APN-Configuration | The access points allowed by the network. Could also reveal private APNs for intranet purposes |
| MIP-Home-Agent-Address | Public IP address in the home network handling the APN |

While eavesdropping on Diameter traffic the subscriber location can be distinguished up to network level only unless the eavesdropper is able to intercept by chance a Diameter request to ascertain the specific subscriber location.

The Diameter protocol can also leak valuable information about network elements. Due to the hop-by-hop nature of the protocol, the network elements that the Diameter message has passed are recorded in the Route-Record field By observing a single Diameter transaction, al the names of al the nodes the message has passed through can be observed. For instance, it reveals the location of the HSS from where subsequent attacks can be prepared. This can be useful when an attacker has access to the IPX network and the ability to inject messages. Assuming the eavesdropper 403 is intercepting all Diameter messages between the visited mobile network 401 and the home mobile network 402, not limited to update location request and update location accept, the eavesdropper 403 could learn the topology of both networks by observing the Diameter messages exchanged as outlined in Table 3:

TABLE 3

Network topology collected in any
Diameter message between LTE roaming operators
Any Diameter message between LTE operator 1
and LTE operator 2

| Topology information | Description |
| --- | --- |
| Origin-Host | The original host that initiated the Diameter message X.epc.mncXXX.mccXXX.3gppnetwork.org |
| Origin-Realm | The realm of the origin host: epc.mncXXX.mccXXX.3gppnetwork.org |
| Destination-Host | The destination host (often known in a subsequent message) X.epc.mncXXX.mccXXX.3gppnetwork.org |
| Destination-Realm | The realm of the destination host: epc.mncXXX.mccXXX.3gppnetwork.org |
| Route-Record | The main goal of the Route-Record is loop prevention, in order to do so it records the hostname of all hostnames that participating in routing of the Diameter message up until retrieval. |

Although the Origin-Realm and Destination-Realm do not contain vital information to reveal the network topology, the Origin-Host and Destination-Host do. After eavesdropping Diameter messages for some time one can determine how many different Diameter hosts are used and how often they show up, the latter is important to discover the more important nodes of an operator by analyzing how often certain hosts show up.

In practice operators use obvious names for their host names such as HSS<city>.epc mncXXX.mccXXX.3gppnetwork.org. Also, in the Route-Record field obvious names are often used for the intermediate hops. Analyzing the route record reveals the route and the amount of hops the Diameter message traveled upon the point of interception. Often, common names are used for Diameter hostnames which is similar to what one would see executing a traceroute command from a computer.

Figure 5:
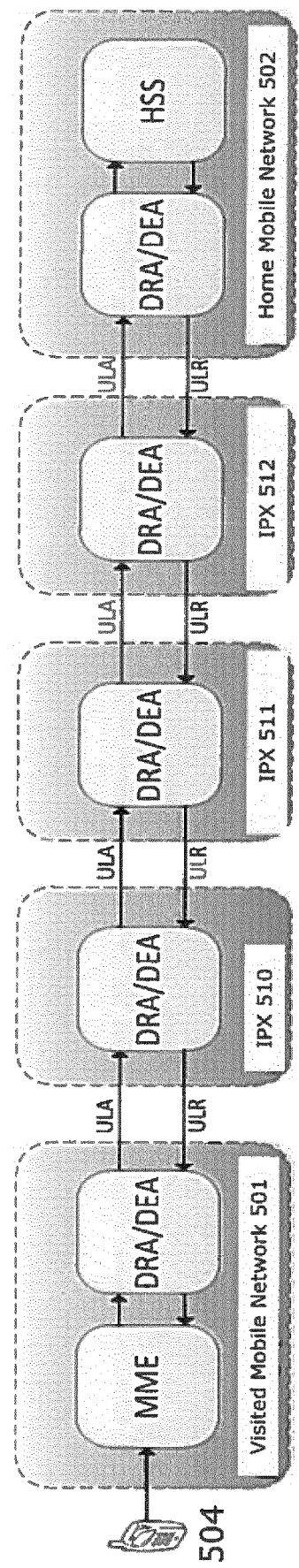
FIG. 5 illustrates an example man-in-the-middle attack within the IPX network.

FIG. 5 illustrates an example man-in-the-middle attack within the IPX network comprising IPX provider 510, IPX provider 511 and IPX provider 512. If an attacker, in this case IPX provider 511, has the opportunity to become part of the message exchange the attacker can perform a man-in-the-middle attack.

In this example, Visited Mobile Network 501 has a trusted relationship with IPX provider 510 and Home Mobile Network 502 has a trusted relationship with IPX provider 512. In the middle however, is IPX provider 511, an IPX provider with evil intentions. IPX provider 511 could in this case change characteristics of the subscriber retrieved from the HSS in the ULA message such as the access point names and corresponding IP addresses to prepare to intercept traffic later.

FIG. 5A illustrates an example of a bad actor injecting messages into the IPX network behind a Visited Mobile Network 601. In this example, an attacker 620 injects messages from behind the Visited Mobile Network 601, whom is most likely trusted by the receiver of the Diameter message. Access to the Visited Mobile Network 601 could have been legitimately granted or illegitimately obtained, either case is theoretically possible.

The attacker 620 is using a Fake MME 630 to impersonate an MME of the Visited Mobile Network 601 in order to obtain subscriber information from the HSS from Visited Mobile Network 601. This is one an example, as in reality the attacker 620 could pretend to be any other network element.

Figure 6A:
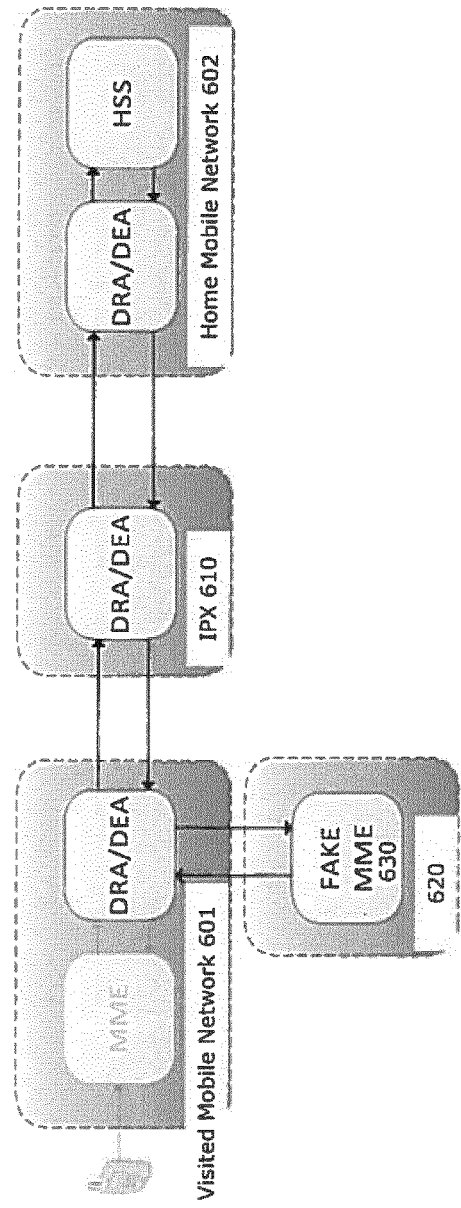
FIG. 6A illustrates an example of a bad actor injecting messages into a IPX network behind a visited mobile network.
Figure 6B:
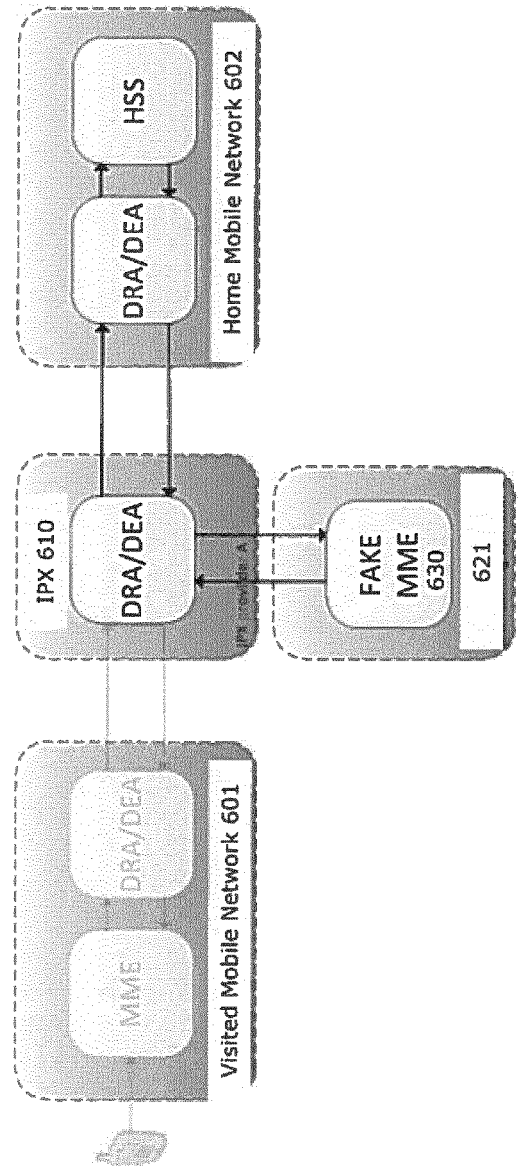
FIG. 6C illustrates an example of an attacker impersonating a Gateway Mobile Location Centre (GMLC) from a visited mobile network.
FIG. 6D illustrates an example of an attacker capable of initiating a Denial of Service attack on a roaming mobile subscriber.

FIG. 6B illustrates an example of an attacker 621 gaining access to the IPX network through IPX provider 610 by impersonating Visited Mobile Network 601. In this scenario attacker 621 uses the origin realm from Visited Mobile Network 601. This is particularly easy if Visited Mobile Network 601 uses a name that is standardized and therefore easy to guess. If attacker 621 manages to obtain access in this manner, they can send messages on the behalf of Visited Mobile Network 601 and due to the hop-by-hop of the Diameter protocol will even get an answer to a spoofed message. Attacker 621 is shown here as somebody that needs to make an effort to gain access to the IPX network, but of course attacker 621 can also be another mobile network operator pretending to be Visited Mobile Network 601.

Figure 6C:
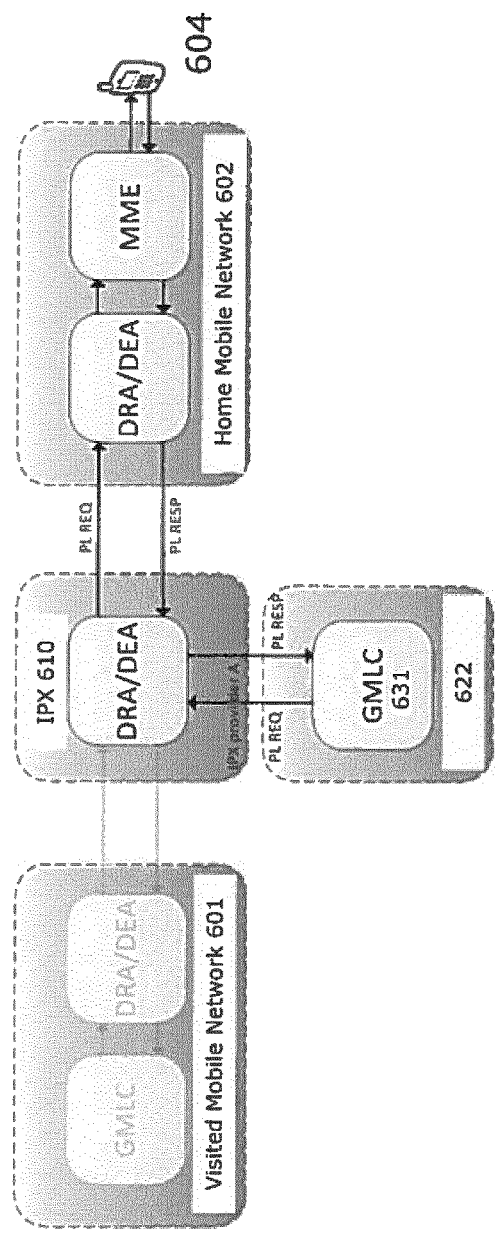

FIG. 6C illustrates an example of an attacker 622 impersonating a Gateway Mobile Location Centre (GMLC) 631 from Visited Mobile Network 601. The GMLC 631 and corresponding Diameter messages "Provide Subscriber Location Request" and "Provide Subscriber Location Response" are used for location based services. These are either for a service that the subscriber 604 is taking from the operator (e.g., home zoning) or for regulating purpose such as determining the location for emergency services.

In this example, the location of the subscriber 604 can be precisely determined. The subscriber's phone 604 is paged to reveal the exact location up to cell level including triangulation information. Also, the age of the location information and the subscriber state (busy/idle) is returned to the GMLC 631.

Figure 6D:
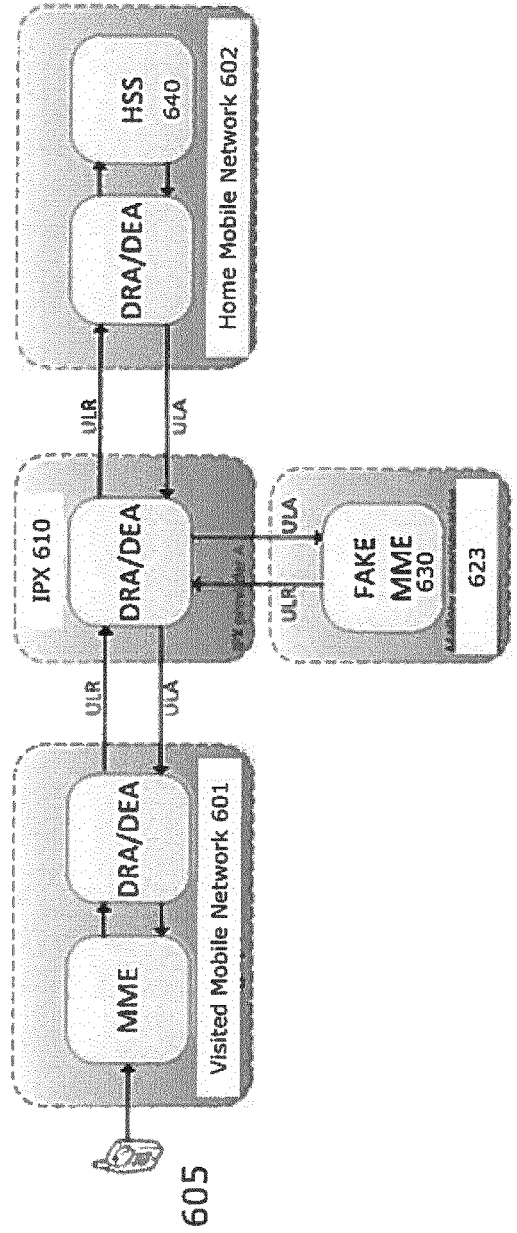

FIG. 6D illustrates an example of an attacker 623 capable of initiating a Denial of Service attack on a roaming mobile subscriber 605. If attacker 623 uses a fake MME 630 and is aware of the IMSI of the subscriber 605, the attacker 623 can inform the HSS 640 via an "Update Location Request" that the subscriber 605 is currently roaming on a different mobile network than Visited Mobile Network 601 (the mobile network subscriber 605 is actually utilizing). Attacker 623 could spoof an "Update Location Request" for the fake MME 630, for instance using the realm of a $3^{rd}$ mobile network that has a roaming agreement with Visited Mobile Network 601.

Even if attacker 623 does not know the authentication information of the SIM card of the subscriber 605 does not hinder the execution of the Denial of Service attack, because an "Update Location Request" may be sent by a mobile operator without sending the "Authentication Information Request/Answer." Upon receiving the spoofed "Update Location Request" the HSS 640 of Home Mobile Network 602 will store the location of the subscriber 605 to the fake location. At this moment, the subscriber 605 will have lost their mobile service. The subscriber 605 cannot be reached for any messages from the HSS 640. As soon as the subscriber 605 is returned to service, either by manually trying or restarting the phone, the fake MME 630 can start the procedure all over again. The success of the attack is dependent on how often and how quick the fake MME 630 can repeat the process after the subscriber 605 has their service restored in Visited Mobile Network 601.

Additional examples of attacks taking advantage of Diameter Protocol signaling include but are not limited to gaining subscriber information other than location information, gaining network topology, and DoS attacks on subscriber groups or an entire mobile network. In summation, eavesdropping is a potential issue where the assets of mobile network operators are in danger. Infecting messages into the IPX network causes even more damage as actual information can be retrieved, and DoS attacks are possible. Presently, mobile network operators have no way to guarantee authenticity and integrity of Diameter signaling messages other than by trusting their IPX provider and the complete ecosystem behind it.

Embodiments of the present disclosure provide a solution that guarantees authenticity and integrity on the signaling exchange between mobile roaming networks. A trusted mobile network operator in this context is an operator that can reasonably be expected to send only legitimate traffic, and does not host evil entities behind the trusted realm. Embodiments of the present disclosure are also able to provide detection of legitimate and illegitimate changes to AVPs in a Diameter protocol message.

Embodiments of the present disclosure protect Diameter message fields in a roaming exchange between two mobile network operators. Some embodiments focus on protecting—to be negotiated-fields in the 3GPP application layer of a Diameter message. Fields in a Diameter message are called AVPs and for purposes of this disclosure the term "AVP to be protected" is used for AVPs that require authenticity and integrity protection.

FIGS. 7A-10 illustrate example embodiments where a Diameter message being exchanged between Mobile Network 701 and Mobile Network 702 with two IPX providers, IPX provider 710 and IPX provider 711, in between the mobile networks. The original Diameter message 750 contains AVP6, AVP7, AVP8 and AVP9 as protected AVPs, which may be part of the entire set of AVPs contained in the Diameter message 750.

This example embodiment does not focus on key establishment, coding, hash type or hash size. These details and additional embodiments can be found below in reference to FIG. 11. For an explanation of the structure of an example of a 3GPP specific AVP, refer to FIG. 12A, FIG. 12B and FIG. 16.

Figure 7A:
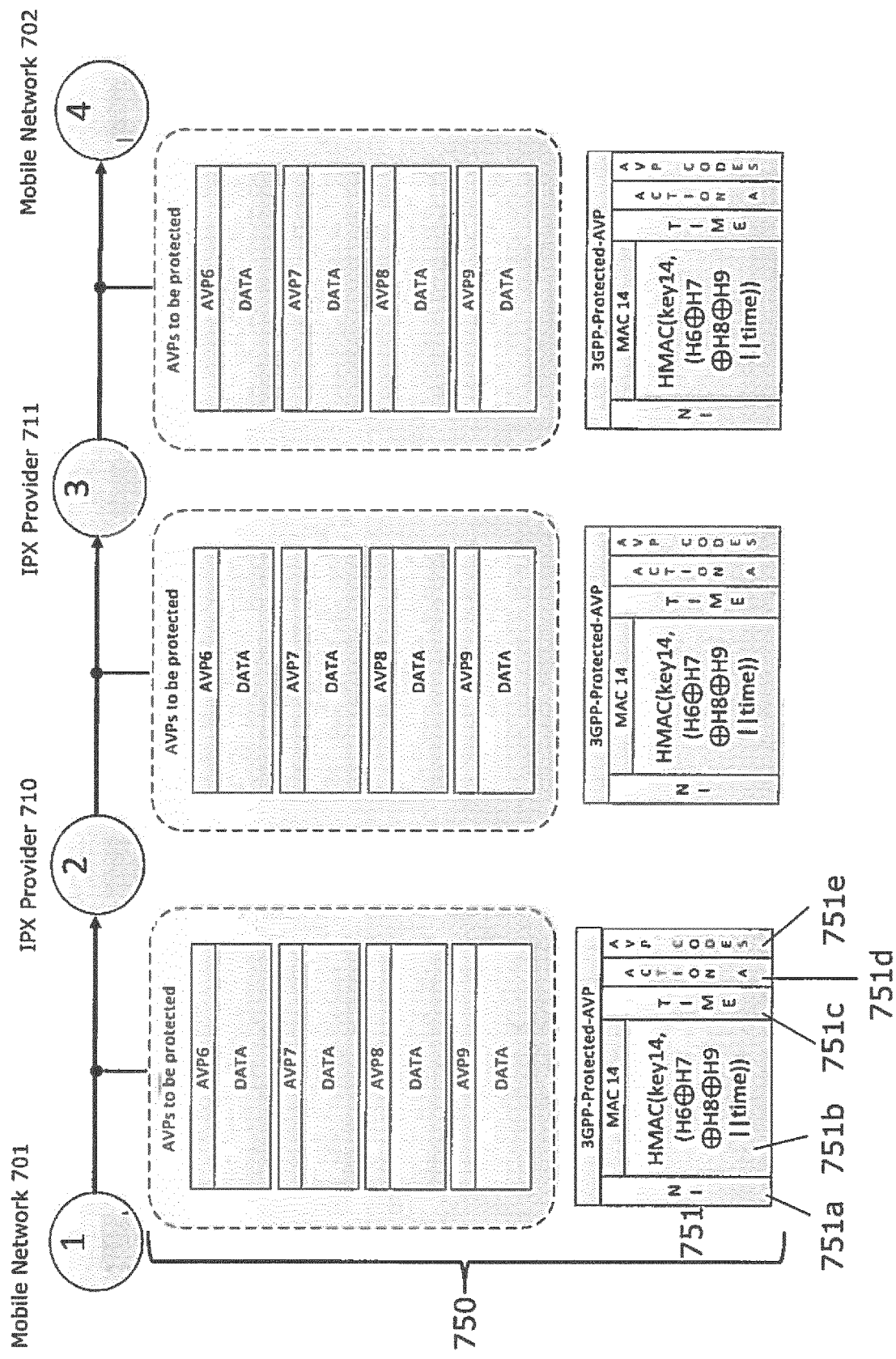
FIG. 7A illustrates an example embodiment with a Diameter signaling protocol message transmitted between two mobile networks without any, additions, deletions or modifications.

FIG. 7A illustrates an example scenario where AVPs of a Diameter message 750 are protected while the message is transmitted between two mobile networks (Mobile Network 701 and Mobile Network 702) without any additions, deletions or modifications from IPX providers 710 and 711. This scenario covers approximately 99% of the message exchanges between mobile network operators providing service to a roaming subscriber.

According to the example embodiment shown in FIG. 7A, the Diameter message 750 contains four AVPs to be protected (Diameter message 750 may contain other AVPs which are not shown). The Diameter message 750 is being exchanged between Mobile Network 701 and Mobile Network 702, via an IPX network including IPX provider 710 and IPX provider 711.

According to this embodiment, the Mobile Network 702 is able to verify the authenticity and integrity of the four AVPs upon receipt of the Diameter message 750, and to conclude whether the AVPs were indeed sent by Mobile Network 701.

Upon generating or receiving the Diameter message from a subscriber device, Mobile Network 701 creates a 3GPP-Protected-AVP 751 to be added to the existing AVPs in the Diameter message 750. The fields of the 3GPP-Protected-AVP 751 may include MAC field 751$b$ with a representation of a cryptographic Hashed Message Authentication Code (HMAC), a network indicator field 751$a$, a timestamp field 751$c$, an action field 751$d$ and an AVP codes field 751$e$ that indicates which AVPs are protected.

According to this example embodiment, Mobile Network 701 receives or creates a Diameter message 750 with four AVP fields that require protection (i.e., AVP6, AVP7, AVP8 and AVP9). Mobile Network 701 (or a network element located on Mobile Network 701, e.g., a DEA or DRA) generates a 3GPP-Protected-AVP 751 to be appended to the Diameter message 750. To protect the integrity of content of AVP6, AVP7, AVP8 and AVP9, Mobile Network 701 individually hashes the content of each of the AVP fields resulting in the hash value H6 for AVP6, the hash value H7 for AVP7, the hash value H8 for AVP8 and the hash value H9 for AVP9. Each hash value is combined with a XOR operation resulting in a single combined hash value CH1, (i.e., H6⊕H7⊕H8⊕H9=CH1). In some embodiments, a timestamp (e.g., UNIX system time) is appended to the result of the XOR operation (i.e., CH1∥time). A HMAC14 is generated using an encryption key (key 14) and the single combined hash value CH1, and according to some embodiments, the appended timestamp, (i.e., HMAC(key 14, H1∥time)=HMAC14). The generated HMAC14 value/number is stored in the MAC field 751$b$ of the 3GPP-Protected-AVP 751.

The MAC field 751$b$ of the 3GPP-Protected-AVP 751 holds HMAC14 which is the result of multiple exclusive or (XOR) operations of the hashes of individual AVP values. In some embodiments, a timestamp is appended to the result of the XOR operations and the same timestamp is added to the timestamp field 751$c$ outside of the HMAC. This is done in order to avoid replay attacks. The timestamp added to both timestamp field 751$c$ and inside the HMAC allows the Mobile Network 702 to confirm the validity of the timestamp (i.e., the time the message was created).

According to the example embodiment illustrated in FIG. 7A, Mobile Network 701 sends the Diameter message 750, which includes AVP6, AVP7, AVP8, AVP9 and the 3GPP-Protected-AVP 751, to IPX Provider 710. The Diameter message 750 continues on a hop-by-hop basis from IPX Provider 710 to IPX Provider 711 to Mobile Network 702. According to this example embodiment, IPX Provider 710 and IPX Provider 711 do not modify the Diameter message 750 while transmitting it to Mobile Network 702.

Mobile Network 702 receives the Diameter message 750 and begins the process to independently generate a recalculated HMAC14 (HMAC14$_{rc}$) based on the symmetric key shared with Mobile Network 701, the AVPs, and the timestamp stored in the timestamp field 751$c$. If the HMAC14$_{rc}$ generated by Mobile Network 702 matches the HMAC14 stored in the MAC field 751$b$ of the 3GPP-Protected-AVP 751, this verifies to Mobile Network 702 that the Diameter message 750 is authentic and has maintained its integrity while being transmitted across the IPX network (i.e., IPX Provider 710 and IPX Provider 711).

Mobile Network 702 generates HMAC14$_{rc}$ by individually hashing the content of each of the AVP fields resulting in a recalculated hash value H6$_{rc}$ for AVP6, a recalculated hash value H7$_{rc}$ for AVP7, a recalculated hash value H8$_{rc}$, for AVP8 and a recalculated hash value H9, for AVP9. Mobile Network 702 combines each recalculated hash value with a XOR operation resulting in a single combined recalculated hash value CH1$_{rc}$ (i.e., H6$_{rc}$⊕H7$_{rc}$⊕H8$_{rc}$⊕H9$_{rc}$=CH1$_{rc}$). If a timestamp was used to generate HMAC14 stored in the MAC field 751$b$, then the timestamp stored in the timestamp field 751$c$ is appended to the result of the XOR operation (i.e., CH1$_{rc}$∥time). The HMAC14, is generated using the shared encryption key (key 14) used by Mobile Network 701 to generate the HMAC14, and the single combined recalculated hash value CH1$_{rc}$, and according to some embodiments, the timestamp from the timestamp field 751$c$, (i.e., HMAC (key 14, CH1$_{rc}$∥time) =HMAC14$_{rc}$). The result of HMAC(key 14, CH1$_{rc}$∥time)) is a number or value that will only match the number/value in the MAC field 751$b$ if each AVP remained unchanged since being sent by Mobile Network 701 and the correct private symmetric key was used. Thus, if HMAC14$_{rc}$, matches HMAC14, Mobile Network 702 can conclude that the Diameter message 750 was sent by Mobile Network 701 and that AVP6-9 were not modified during transit. Additionally, if the timestamp was used, Mobile Network 702 is able to confirm when the message was originally sent to ensure that it is not being "replayed" or resent by a bad actor performing some type of replay attack.

Further, the usage of XOR operations has the advantage that the processing order of AVP6-9 is irrelevant. For example, H6⊕H7⊕H8⊕H9 leads to the same calculation as H7⊕H9⊕H6⊕H8. This is an advantage because it makes the solution independent of the order the receiver handles the AVPs.

According to some embodiments, the additional fields of the 3GPP-Protected-AVP 751 may be filed. The network indicator field indicates the mobile network that created the 3GPP-Protected-AVP 751. The receiving mobile network uses that indication to choose the shared symmetric private key (key 14) between the two mobile networks to authenticate the message. Alternatively, some embodiments may utilize an asymmetric key, in which case the receiving mobile network would utilize the proper public key for the originating mobile network to authenticate the Diameter message.

One example of an asymmetric key that may be used is the Digital Signature Standard (DSS) or the Digital Signature Algorithm (DSA). A digital signature consists of a pair of large numbers that are computed according to an algorithm (DSA) that enable authentication of a message or file that was signed by a signatory. Digital signatures are generated in conjunction with the use of a private key. The digital signatures are associated with a corresponding public key. Thus, each signatory has their own paired public (known to the public) and private (known only to the signatory) keys. Because a digital signature can only be generated by an authorized person using their private key, the corresponding public key can be used by anyone to verify the signature. One skilled in the art would recognize that digital signatures may be used in embodiments of the present disclosure in place of private symmetric keys.

The network indicator field 751*a* Indicates which key is used for the HMAC in the MAC field 751*b*. For this example it it is assumed there is a private symmetric key (key 14) available between Mobile Network 701 and Mobile Network 702.

The timestamp field 751*c* includes the same timestamp that used to generate the HMAC. The receiving mobile network needs this timestamp to authenticate the Diameter message if a timestamp was used to generate the HMAC, as it will be used to recalculate the matching $HMAC_{rc}$.

The action field 751*d* indicates whether the 3GPP-Protected-AVP 751 was added as a result of the creation of the Diameter message, the addition of an AVP, the modification of an AVP or the deletion of an AVP. The AVP codes field 751*e* indicates the AVPs that were protected by the sender (or added, modified or deleted by another entity).

Figure 7B:
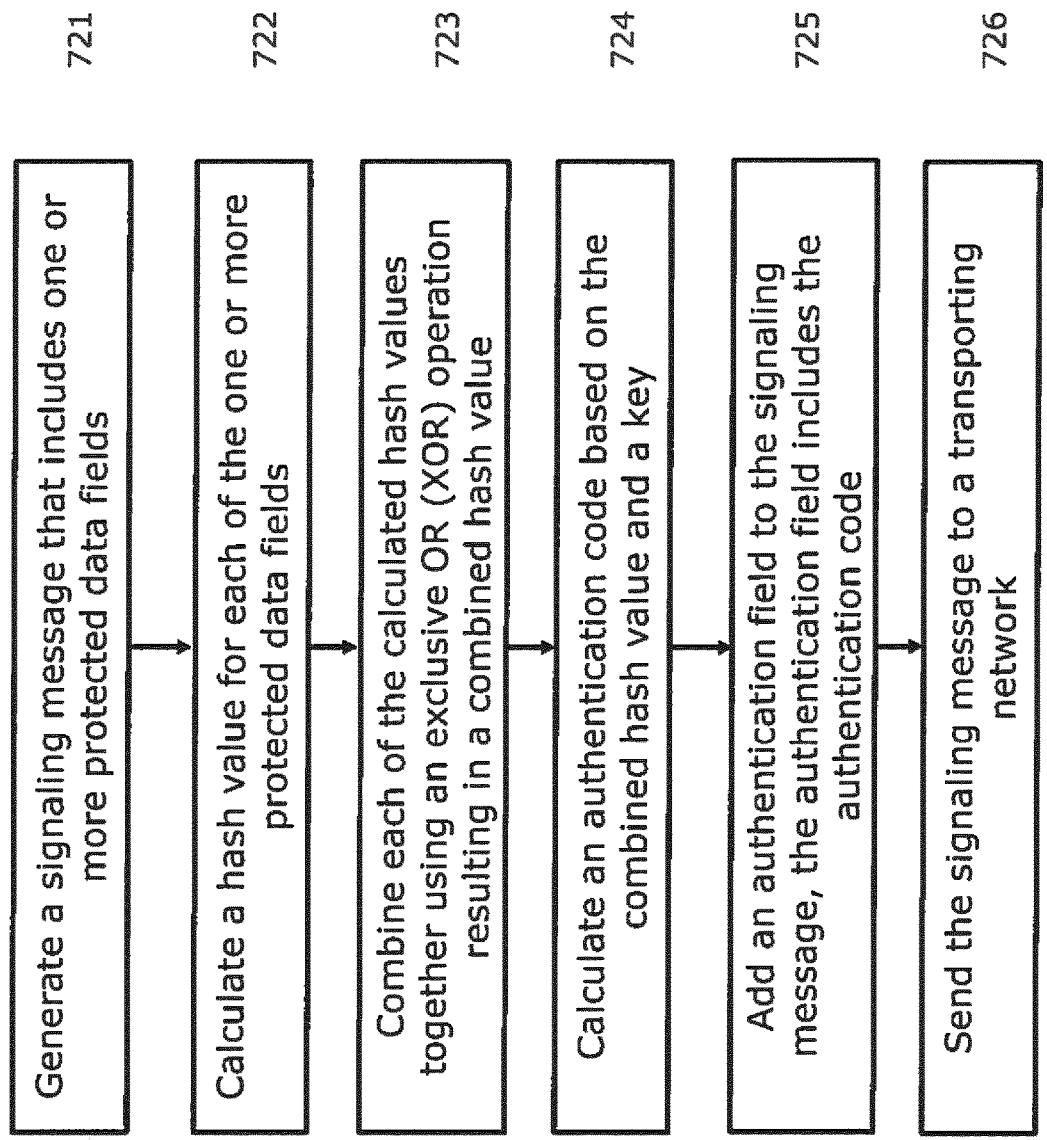
FIG. 7C is a flow chart illustrating an example method a receiving mobile network may use to authenticate a received Diameter signaling protocol message.

FIG. 7B is a flow chart illustrating an example method/process 700 that Mobile Network 701 (or a network element that handles Diameter signaling located on Mobile Network 701) uses to protect the integrity and authencity of a Diameter protocol message. According to the example method/process 700, a network element located on the Mobile Network 701 may be configured to generate a signaling message that includes one or more protected data fields 721, calculate a hash value for each of the one or more protected data fields 722, combine each of the calculated hash values together using an exclusive OR (XOR) operation resulting in a combined hash value 723. The network element may be further configured to calculate an authentication code based on the combined hash value and a key 724, add an authentication field to the signaling message, the authentication field storing the authentication code 725, and send the signaling message to a transporting network 726.

Figure 7C:
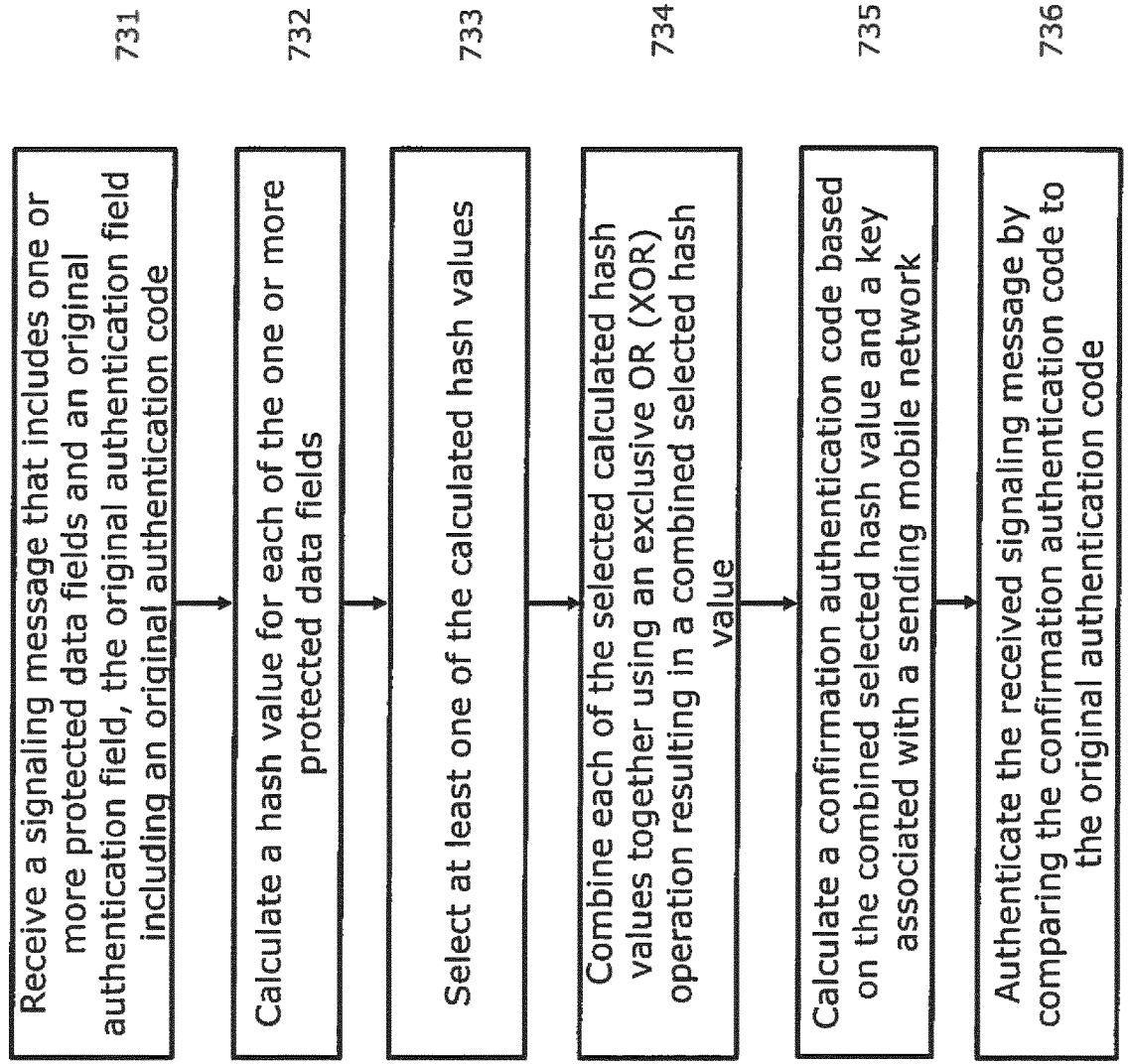

FIG. 7C is a flow chart illustrating an example method/process 730 that Mobile Network 702 (or a network element that handles Diameter signaling located on Mobile Network 702) uses to authenticate a received Diameter protocol message. According to the example method/process 730, a network element located on the Mobile Network 702 may be configured to receive a signaling message that includes one or more protected data fields and an original authentication field, the original authentication field including an original authentication code 731, calculate a hash value for each of the one or more protected data fields 732, select at least one of the calculated hash values 733, combine each of the selected calculated hash values together using an exclusive OR (XOR) operation resulting in a combined selected hash value 734, calculate a confirmation authentication code based on the combined selected hash value and a key associated with a sending mobile network 735, and authenticate the received signaling message by comparing the confirmation authentication code to the original authentication code 736.

FIG. 5A illustrates an example scenario where AVPs (AVP10 and AVP11) are added to the Diameter message 750 by IPX Provider 711 while the message is transmitted between Mobile Network 701 and Mobile Network 702. This example scenario is similar to the scenario illustrated in FIG. 7A. However, in this scenario IPX Provider 711 adds another 3GPP-Protected-AVP 753 to protect newly added AVP10 and AVP11.

In some embodiments, the 3GPP-Protected-AVP that is added is placed on top of an earlier added 3GPP-Protected-AVP to ensure the 3GPP-Protected-AVP fields are processed in the correct order. Alternatively, the 3GPP-Protected-AVP that is subsequently added can be appended on the bottom of an earlier added 3GPP-Protected-AVP field as long as the order is established, as the receiving mobile network will need to process the 3GPP-Protected-AVP fields in the correct order. Utilizing a specific order to subsequently add 3GPP-Protected-AVP fields also enables subsequent modifications to the same AVP during transit of a Diameter message.

Figure 8A:
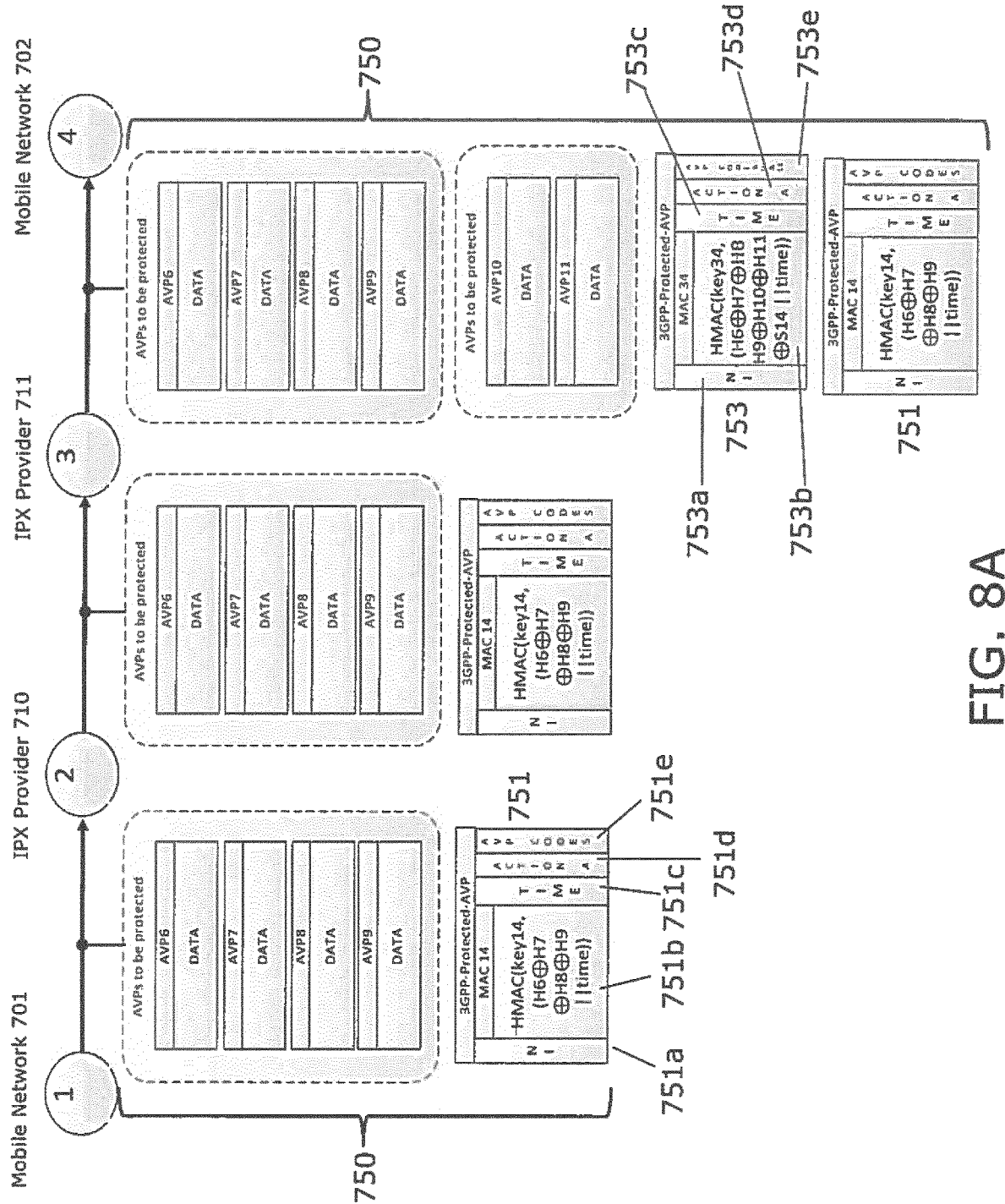
FIG. 8A illustrates an example embodiment where AVPs are added to a Diameter message by an IPX provider while the message is transmitted between mobile networks.

Referring back to the example embodiment in FIG. 8A, the newly added 3GPP-Protected-AVP 753 prevents the added AVP10 and AVP11 from being deleted by an attacker during transit of the Diameter message 750 before the Diameter message 750 is received by Mobile Network 702. According to this example, IPX Provider 711 (or a network element located on the IPX Provider 711 network) adds AVP10 and AVP11 to the Diameter message 750, and generates the new 3GPP-Protected-AVP 753 to be appended to the Diameter message 750. In some embodiments, IPX Provider 711 may generate 3GPP-Protected-AVP 753 by individually hashing the content of each of the AVP fields resulting in the hash value H6 for AVP6, the hash value H7 for AVP7, the hash value H8 for AVP8, the hash value H9 for AVP9, the hash value H10 for AVP10 and the hash value H11 for AVP11. Each hash value H6–H11 and the HMAC14 (represented as S14) stored in the MAC field 751*b* in the 3GPP-Protected-AVP 751 is combined with a XOR operation resulting in a single combined hash value CH2. (i.e., H6⊕H7⊕H8⊕H9⊕H10⊕H11⊕S14=CH2). In some embodiments, the hash values H6–H11 are combined with a XOR operation, but not with any HMAC value from one or more previous 3GPP-Protected-AVPs. In some embodiments, the timestamp (e.g., UNIX system time) is appended to the result of the XOR operation (I.e., CH2∥time). HMAC34 is generated using an encryption key (key 34) and the single hash value CH2, and according to some embodiments, the appended timestamp, (i.e., HMAC(key 34, CH2∥time)=HMAC34). The generated HMAC34 value/number is stored in the MAC field 753*b* of the 3GPP-Protected-AVP 753.

According to this example, HMAC34 is generated based on the hash values H6-H11 and the HMAC14 value from the previously generated 3GPP-Protected-AVP to prevent an attacker from deleting the previously generated 3GPP-Protected-AVP while the Diameter message 750 is in transit. This technique effectively chains the 3GPP-Protected-AVPs in a Diameter message 750 together.

According to this example, Mobile Network 702 receives the Diameter message 750 (including the added AVP10 and AVP11, the 3GPP-Protected-AVP 753 and the 3GPP-Protected-AVP 751) and analyzes the two 3GPP-Protected-AVP fields 751 and 753 top-down or in an alternate established order. In some embodiments, Mobile Network 702 determines that 3GPP-Protected-AVP 753 was added by IPX Provider 711 based on the network indicator field 753*a* indicating IPX provider 711. In some embodiments, Mobile Network 702 determines that IPX Provider 711 added AVPs to the Diameter message 750 based on the action indicator field 753*d* indicating that addition of at least one AVP was the action that triggered the creation of 3GPP-Protected-AVP 753. In some embodiments, Mobile Network 702 determines that AVP10 and AVP11 were the AVPs that were added based on the AVP code indicator field 753*e*.

According to this example, Mobile Network 702 receives the Diameter message 750 and begins the process to independently generate a recalculated HMAC34 (HMAC34$_{rc}$) for each 3GPP-Protected-AVP field in the Diameter message 750 to compare to the HMACs stored in MAC field 753*b* and MAC field 751*b* respectively. If the recalculated HMACs generated by Mobile Network 702 match the HMACs stored in MAC field 751*b* and MAC field 753*b*, this verifies to Mobile Network 702 that the original AVPs (AVP6-9) and the added AVPs (AVP10 and AVP11) are authentic and have maintained their integrity while being transmitted across the IPX network (i.e., IPX Provider 710 and IPX Provider 711).

As stated above, Mobile Network 702 analyzes the two 3GPP-Protected-AVP fields 751 and 753 top-down, starting with 3GPP-Protected-AVP 753. Mobile Network 702 generates the HMAC34$_{rc}$ by individually hashing the content of each of the AVP fields resulting in a recalculated hash value H6$_{rc}$ for AVP6, a recalculated hash value H7$_{rc}$ for AVP7, a recalculated hash value H8$_{rc}$ for AVP8, a recalculated hash value H9$_{rc}$ for AVP9, a recalculated hash value H10$_{rc}$ for AVP10 and a recalculated hash value H11$_{rc}$ for AVP11. Mobile Network 702 combines each hash value H6$_{rc}$–H11$_{rc}$ and HMAC14 (represented as S14) stored in the MAC field 751*b* in the 3GPP-Protected-AVP 753 with a XOR operation resulting in a single combined hash value CH2$_{rc}$, (i.e., H6$_{rc}$⊕H7$_{rc}$⊕H8$_{rc}$⊕H9$_{rc}$⊕H10$_{rc}$H11$_{rc}$⊕S14=CH2$_{rc}$). If a timestamp was used when HMAC34 stored in the MAC field 753*b* was generated, then the timestamp stored in the timestamp field 753*c* is appended to the result of the XOR operation (i.e., CH2$_{rc}$∥time). Mobile Network 702 generates HMAC34$_{rc}$, using the shared encryption key (key 34) used by IPX Provider 711 to generate the HMAC34, and the single combined hash value CH2$_{rc}$, and according to some embodiments, the timestamp from the timestamp field 753*c*, (i.e., HMAC (key 34, CH2$_{rc}$∥time)=HMAC34$_{rc}$). The result of HMAC(key 34, CH2$_{rc}$∥time)) is a number or value that will only match the number/value in the MAC field 753*b* If each AVP remained unchanged since the Diameter message 750 passed through IPX Provider 711 and that AVP10 and AVP11 were added by IPX Provider 711. In other words, if HMAC34$_{rc}$, matches HMAC34, Mobile Network 702 can conclude that the Diameter message 750 was not modified during transit from IPX Provider 711 to Mobile Network 702 and IPX Provider 711 is the entity that added AVP10 and AVP11 because IPX Provider and Mobile Network 702 are the only entity with the access to key34. Additionally, if the the timestamp was used, Mobile Network 702 is able to confirm when the message was sent from IPX Provider 711 to ensure that it is not being "replayed" or resent by a bad actor performing some type of replay attack.

According to the example embodiment, Mobile Network 702 progresses to 3GPP-Protected-AVP 751 and analyzes 3GPP-Protected-AVP 751 as shown in FIG. 7A and described above. As described above, if HMAC14$_{rc}$, matches HMAC14 in the MAC field 751*b* the Diameter message 750 was sent from Mobile Network 701 and was not modified in transit between Mobile Network 701 and IPX Provider 711.

Figure 8B:
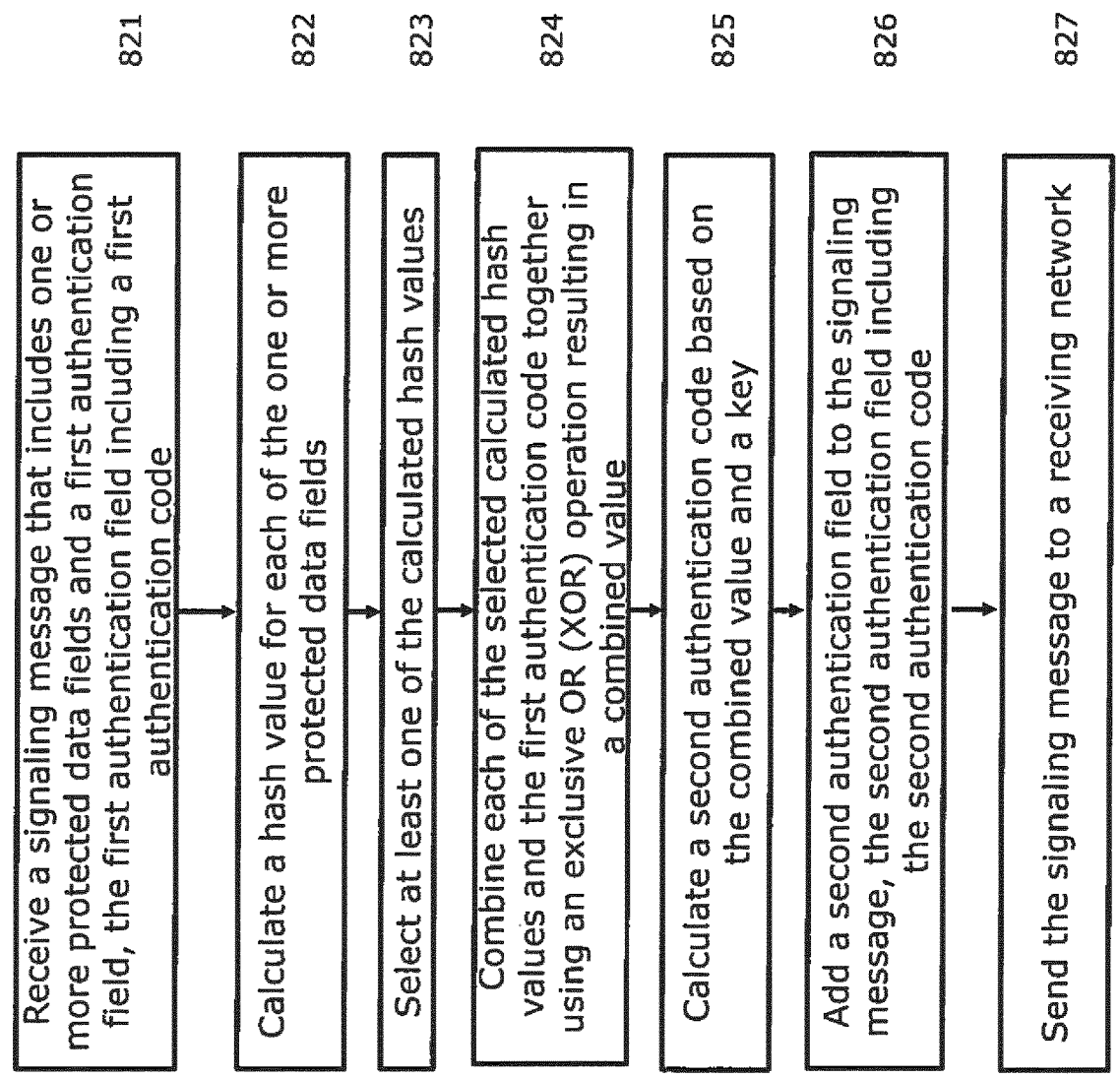
FIG. 8B is a flow chart illustrating an example method an IPX provider may use to protect the integrity and authencity of AVPs it adds to the Diameter signaling protocol message.

FIG. 8B is a flow chart illustrating an example method/process 800 that IPX provider 711 (or a network element that handles Diameter signaling located on IPX provider 711) uses to protect the integrity and authencity of AVPs it adds to the Diameter protocol message. According to this example embodiment, a network element located on IPX provider 711 may be configured to receive a signaling message that includes one or more protected data fields and a first authentication field, the first authentication field including a first authentication code 821. In some embodiments, the network element may be further configured to calculate a hash value for each of the one or more protected data fields 822, select at least one of the calculated hash values 823, and combine each of the selected calculated hash values and the first authentication code together using an exclusive OR (XOR) operation resulting in a combined value 824. In some embodiments, the network element may be further configured to calculate a second authentication code based on the combined value and a key 825, add a second authentication field to the signaling message, the second authentication field including the second authentication code 826, and send the signaling message to a receiving network 827.

Figure 9A:
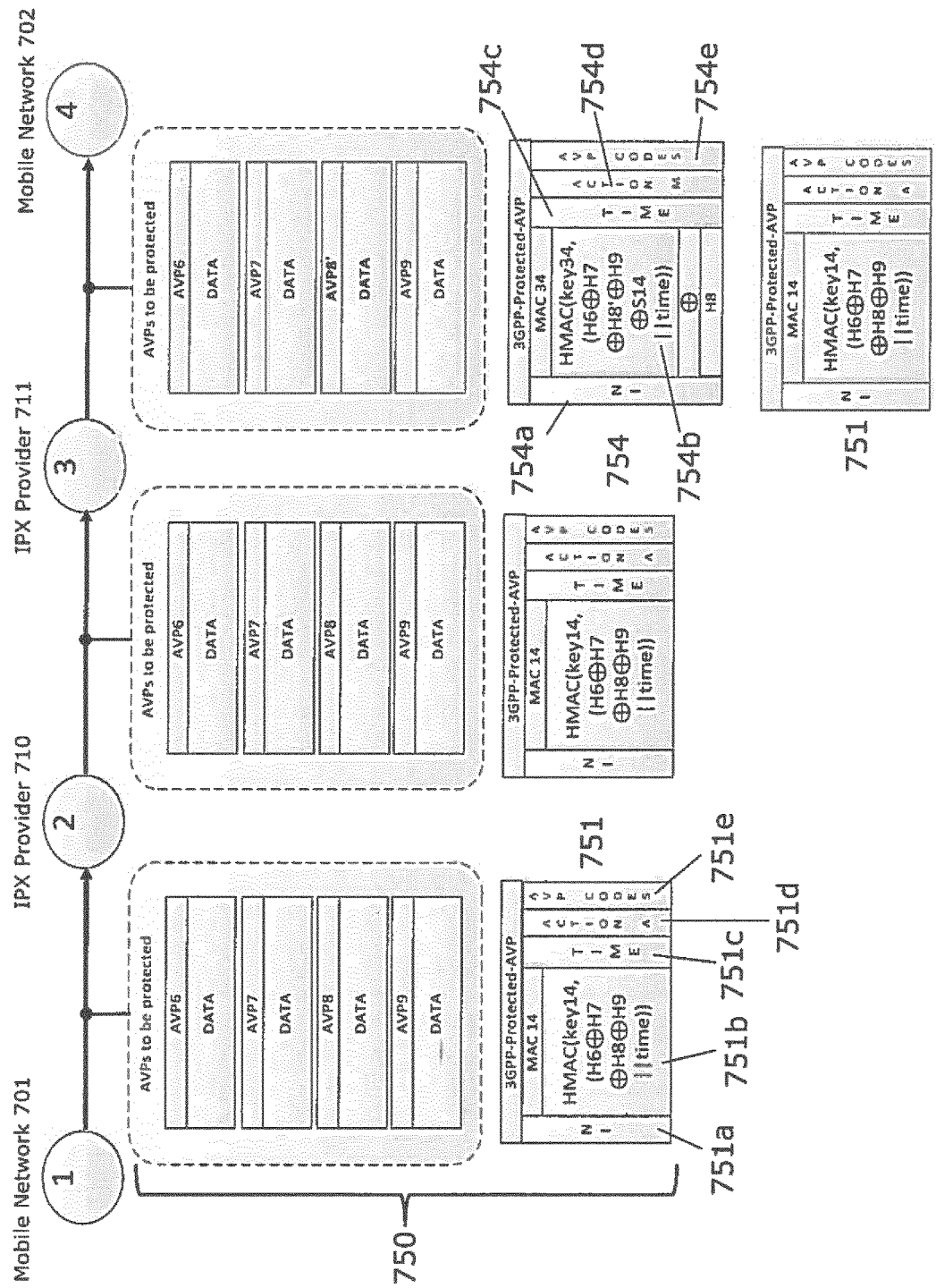
FIG. 9A illustrates an example embodiment where an AVP in a Diameter signaling protocol message is modified by an IPX provider while the message is transmitted between mobile networks.

FIG. 9A illustrates an example embodiment where an AVP in Diameter message 750 is modified by IPX Provider 711 while the message is transmitted between Mobile Network 701 and Mobile Network 702. In this embodiment IPX Provider 711 modifies AVP8, which is a protected AVP in the exchange between Mobile Network 701 and Mobile Network 702. Note: the prime (') in AVP8' signifies the modified version of AVP8.

In this embodiment, Mobile Network 702 must determine that Diameter message 750 was sent by Mobile Network 701 and that AVP8 was modified by IPX Provider 711 (and not anywhere else in transit) and that AVP6, AVP7 and AVP9 where unmodified from Mobile Network 701 to Mobile Network 702.

A fundamental problem that embodiments of the present disclosure solve is that the HMAC14 in the 3GPP-Protected-AVP 751 from Mobile Network 701 contains the hash value (H8) of AVP8. Thus, Mobile Network 702 needs to the original content of AVP8 or the hash value of AVP8 (which is no longer available) in order to recalculate HMAC14. Because the content of AVP8 has been modified to AVP8', the authenticity and integrity of al the AVPs cannot be calculated exactly as described above.

Technically, IPX Provider 711 could inherit the responsibility of validating the authenticity and integrity of the Diameter message 750, but then Mobile Network 702 must fully trust IPX Provider 711 to fulfill this task. Instead, according to the example embodiment, Mobile Network 702 is able to confirm the authenticity and integrity of AVP6 to AVP9 sent by Mobile Network 701 and the authenticity and integrity of AVP8' which was modified by IPX Provider 711, without the need to trust another entity's confirmation of such.

According to this embodiment, IPX Provider 711 receives the Diameter message 750 and desires to modify AVP8, however IPX Provider 711 determines that AVP8 is protected based on the AVP codes indicator field 751*e*. To modify AVP8 and to protect AVP8', IPX Provider 711 generates 3GPP-Protected-AVP 754 with MAC field 754*b* that contains HMAC34 generated with the key shared (key 34) between IPX Provider 711 and Mobile Network 702.

According to this embodiment, IPX Provider 711 may generate 3GPP-Protected-AVP 754 by individually hashing the content of each of the AVP fields resulting in the hash value H6 for AVP6, the hash value H7 for AVP7, the hash value H8 for AVP8 and the hash value H9 for AVP9. Additionally, IPX Provider 711 also hashes the content of the modified AVP8', which results in the hash value H8'. Each hash value H6-H9 and the HMAC (S14) stored in the MAC field 751$b$ in the 3GPP-Protected-AVP 751 is combined with a XOR operation resulting in a single combined hash value CH3, (i.e., H6⊕H7⊕H8⊕H9≠S14=CH3). In some embodiments, the hash values H6-H9 are combined with a XOR operation, but not with any HMAC value from one or more previous 3GPP-Protected-AVPs. In some embodiments, the timestamp (e.g., UNIX system time) is appended to the result of the XOR operation (i.e., CH3∥time). HMAC34 is generated using an encryption key (key 34) and the single combined hash value CH3, and according to some embodiments, the appended timestamp, (i.e. HMAC(key 34, CH3∥time)=HMAC34).

According to the example embodiment, IPX Provider 711 combines the HMAC(key 34, CH3∥time) with the hash value H8 with a XOR operation (HMAC(key 34, CH3∥time) ⊕H8=HMAC34⊕H8) and then stores the result in MAC field 754$b$ of 3GPP-Protected-AVP 754. IPX Provider 711 further adds in the action field 754$d$ to indicate that a modification occurred and also records which AVPs were modified in the AVP codes field 754$e$.

According to the example embodiment, Mobile Network 702 receives the Diameter message 750 (including the modified AVP8', the 3GPP-Protected-AVP 754 and the 3GPP-Protected-AVP 751) and analyzes the two 3GPP-Protected-AVP fields 751 and 754 from top-down or an alternate established order. In some embodiments, Mobile Network 702 determines that 3GPP-Protected-AVP 754 was added by IPX Provider 711 based on the network indicator field 754$a$ indicating IPX provider 711. In some embodiments, Mobile Network 702 determines that IPX Provider 711 modified one or more AVPs in the Diameter message 750 based on the action indicator field 754$d$ indicating that modification of an AVP was the action that triggered the creation of 3GPP-Protected-AVP 754. In some embodiments, Mobile Network 702 determines that AVP8' was the AVP that was modified based on the AVP code indicator field 754$e$.

According to the example shown in FIG. 9A, Mobile Network 702 analyzes the two 3GPP-Protected-AVP fields 751 and 754 top-down, starting with the most recently added 3GPP-Protected-AVP 754. Mobile Network 702 generates the recalculated HMAC34$_{rc}$ by individually hashing the content of each of the AVP fields resulting in a recalculated hash value H6$_{rc}$ for AVP6, a recalculated hash value H7$_{rc}$ for AVP7, a recalculated hash value H8'$_{rc}$ for AVP8', and a recalculated hash value H9$_{rc}$ for the AVP9. Mobile Network 702 combines each recalculated hash value H8$_{rc}$-H9$_{rc}$ and the HMAC14 (represented as S14) stored in the MAC field 751$b$ in the 3GPP-Protected-AVP 751 with a XOR operation resulting in a single combined hash value CH3$_{rc}$, (i.e., H6$_{rc}$⊕H7$_{rc}$⊕H8'$_{rc}$⊕H9$_{rc}$⊕S14=CH3$_{rc}$). If a timestamp was used when the HMAC stored in the MAC field 753$b$ was generated, then the timestamp stored in the timestamp field 753$c$ is appended to the result of the XOR operation (i.e., CH2$_{rc}$∥time). Next, Mobile Network 702 generates HMAC34$_{rc}$ using the shared encryption key (e.g., key 34) used by IPX Provider 711 to generate HMAC34, and the single combined hash value CH3$_{rc}$ and according to some embodiments, the timestamp from the timestamp field 753$c$, (i.e., HMAC (key 34, CH3$_{rc}$∥time)=HMAC34$_{rc}$).

According to this example, Mobile Network 702 may now solve for the hash value (H8) of the original unmodified AVP8. Mobile Network 702 needs the hash value H8 to verify HMAC value in the MAC field 751$b$ in 3GPP-Protected-AVP 751. However, Mobile Network 702 no longer has access to the original value in the unmodified AVP8, but can solve for H8 because IPX Provider 711 combined HMAC34 with the hash value H8 with a XOR operation HMAC34⊕H8). Since, Mobile Network 702 has recalculated HMAC34$_{rc}$, it may solve for H8, as H8= (HMAC 34⊕H8)⊕HMAC34$_{rc}$, with the value of (HMAC34⊕H8) being obtained from the MAC field 754$b$ of 3GPP-Protected-AVP 754.

Mobile Network 702 may then verify HMAC14 in the MAC field 751$b$ of 3GPP-Protected-AVP 751 in the same manner as described above in reference to FIG. 7A, as Mobile Network 702 now has the hash value H8. If the MAC field 751$b$ is verified to be correct, Mobile Network 702 can conclude that the Diameter message 750 was not modified during transit from Mobile Network 701 to IPX Provider 711 and that Mobile Network 701 is the entity that created the Diameter message 750. And because the verification of HMAC14 was based on the verification of HMAC34, Mobile Network 702 can also conclude that the Diameter message 750 was not modified during transit from IPX Provider 711 to Mobile Network 702 and IPX Provider 711 is the entity that modified AVP8 because IPX Provider 711 and Mobile Network 702 are the only entities with the access to key34. Additionally, if the timestamp was used, Mobile Network 702 is able to confirm when the original message was sent from Mobile Network 701 and when the modified message was sent from IPX Provider 711 to ensure that it is not being "replayed" or resent by a bad actor performing some type of replay attack.

Figure 9B:
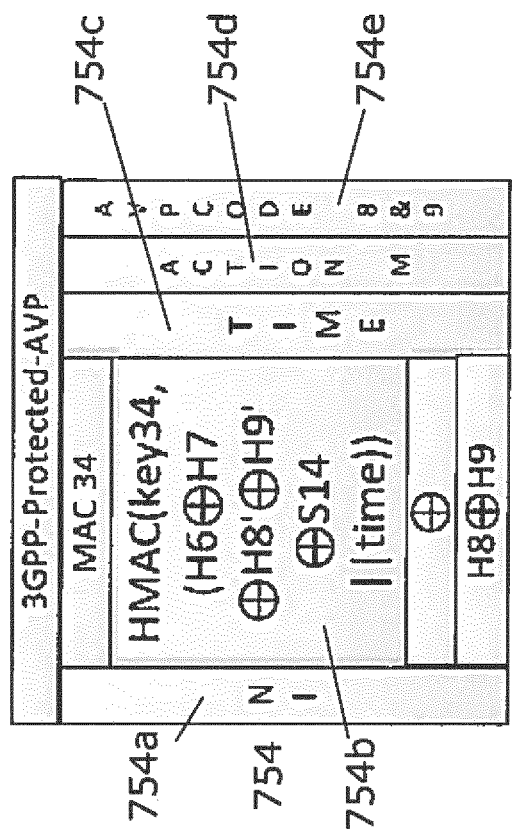
FIG. 9B illustrates an example 3GPP-Protected-AVP in a Diameter signaling protocol message when two AVPs are modified in transit.

A similar process applies when multiple AVPs are modified by the same entity without the need to add a separate 3GPP-Protected-AVP field. For example, if AVP8 and AVP9 were modified by IPX Provider 711, IPX Provider 711 may XOR the calculated HMAC34 against the XOR of the hash of AVP8 and the hash of AVP9 and stores the result in the MAC field 751$b$. FIG. 9B shows the contents of the 3GPP-Protected-AVP 754 according to this alternate scenario. The calculated value will be used as input for the original 3GPP-Protected-AVP field between Mobile Network 701 and Mobile Network 702. The XOR operation is used, because the order of the hashes does not matter as one is still able to verify the original 3GPP-Protected-AVP field sent by Mobile Network 701.

Figure 10:
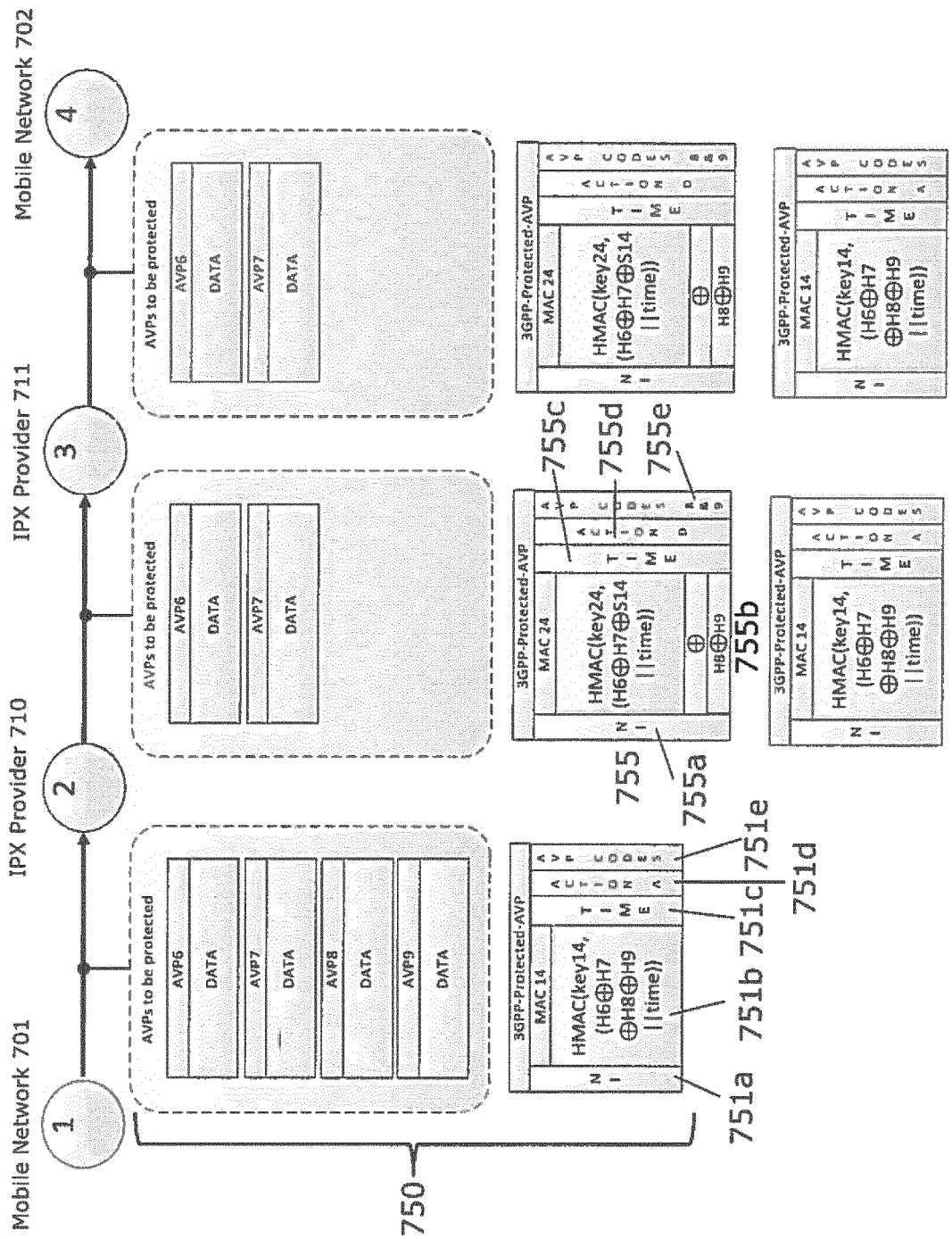
FIG. 10 illustrates an example embodiment where one or more AVPs in a Diameter signaling protocol message are deleted by an IPX provider while the message is transmitted between mobile networks.

FIG. 10 illustrates an example embodiment where one or more AVPs in Diameter message 750 are deleted by IPX Provider 710 while the message is transmitted between Mobile Network 701 and Mobile Network 702. This example embodiment is similar to the previous example embodiment of FIG. 9A described above. In this example embodiment, IPX Provider 710 deletes AVP8 and AVP9, which are protected AVPs in the Diameter message 750 being exchanged between Mobile Network 701 and Mobile Network 702. Once Mobile Network 702 receives the Diameter message 750 it must determine that Diameter message 750 was sent by Mobile Network 701 and that AVP8 and AVP9 were deleted by IPX Provider 710 (and not anywhere else in transit) and that AVP6 and AVP7 where unmodified from Mobile Network 701 to Mobile Network 702. However, Mobile Network 702 will need the hash values H8 and H9 of the deleted AVP8 and AVP9, but will not have access to the deleted values when it receives the Diameter message 750. The process described below accounts for AVP8 and AVP9 not being available to Mobile Network 702.

According to this example embodiment, IPX Provider 710 receives the Diameter message 750 and desires to delete AVP8 and AVP9, however IPX Provider 710 determines that AVP8 and AVP9 are protected AVPs based on the AVP codes indicator field 751e. To delete AVP8 and AVP9, IPX Provider 710 generates 3GPP-Protected-AVP 755 with MAC field 755b that contains an HMAC generated with the key shared between IPX Provider 710 and Mobile Network 702 (i.e., key 24). According to this embodiment, IPX Provider 710 may generate HMAC24 to be stored in 3GPP-Protected-AVP 755 by individually hashing the content of each of the remaining AVP fields resulting in the hash value H6 for AVP6 and the hash value H7 for AVP7. Additionally, IPX Provider also hashes the content of AVP8 and AVP9, which results in the hash values H8 and H9, respectively. The hash values H6 and H7 and the HMAC14 (represented as 814) value stored in the MAC field 751b in the 3GPP-Protected-AVP 751 is combined with a XOR operation resulting in a single combined hash value CH4, (i.e., H6⊕H7⊕S14=CH4). In some embodiments, the hash values H6 and H7 are combined with a XOR operation, but not with any HMAC value from one or more previous 3GPP-Protected-AVPs. In some embodiments, the timestamp (e.g., UNIX system time) is appended to the result of the XOR operation (i.e., H4||time). The HMAC24 is generated using an encryption key (key 24) and the single combined hash value CH4, and according to some embodiments, the appended timestamp, (i.e., HMAC(key 24, CH4||time) a HMAC24).

According to the example embodiment, IPX Provider 710 then combines the result of HMAC(key 24, CH4||time) with the hash values H8 and H9 with a XOR operation (HMAC (key 24, CH4||time)⊕H8⊕H9) and then stores the result in MAC field 755b of 3GPP-Protected-AVP 755. IPX Provider 710 further adds in the action field 755d to indicate that a deletion occurred and also records which AVPs were deleted in the AVP codes field 755e.

According to the example embodiment, Mobile Network 702 receives the Diameter message 750 (without the deleted AVP8 and AVP9 and including the 3GPP-Protected-AVP 755 and the 3GPP-Protected-AVP 751) and analyzes the two 3GPP-Protected-AVP fields 751 and 755 from top-down or an alternate established order. In some embodiments, Mobile Network 702 determines that 3GPP-Protected-AVP 755 was added by IPX Provider 710 based on the network indicator field 755a indicating IPX provider 710. In some embodiments, Mobile Network 702 determines that IPX Provider 710 deleted one or more AVPs in the Diameter message 750 based on the action indicator field 755d indicating that deletion of an AVP was the action that triggered the creation of 3GPP-Protected-AVP 755. In some embodiments, Mobile Network 702 determines that AVP8 and AVP9 were deleted based on the AVP code indicator field 755e.

According to the example shown in FIG. 10, Mobile Network 702 analyzes the two 3GPP-Protected-AVP fields 751 and 755 top-down, starting with the most recently added 3GPP-Protected-AVP 755. Mobile Network 702 generates the recalculated HMAC24$_{rc}$ by individually hashing the content of each of the AVP fields resulting in a recalculated hash value H6$_{rc}$ for AVP6 and a recalculated hash value H7$_{rc}$ for AVP7. Mobile Network 702 combines the recalculated hash values H6$_{rc}$ and H7$_{rc}$ and HMAC14 (represented as S14) stored in the MAC field 751b in the 3GPP-Protected-AVP 751 with a XOR operation resulting in a single combined hash value CH4$_{rc}$, (i.e., H6$_{rc}$⊕H7$_{rc}$⊕S14=CH4$_{rc}$). If a timestamp was used when HMAC14 was stored in the MAC field 755b was generated, then the timestamp stored in the timestamp field 755c is appended to the result of the XOR operation (i.e., CH4$_{rc}$||time). Next, Mobile Network 702 generates HMAC24$_{rc}$, using the shared encryption key (key 24) used by IPX Provider 710 to generate HMAC24, and the single combined hash value CH4$_{rc}$, and according to some embodiments, the timestamp from the timestamp field 755c, (i.e., HMAC (key 24, CH4$_{rc}$||time)).

According to this example, Mobile Network 702 may now solve for the result of the XOR operation of H8 and H9 (H8⊕H9). It should be noted that Mobile Network is unable to solve for the individual hash values of AVP8 and AVP9, but does not need the individual values as the result of the XORed hash values is al that is needed to recalculate HMAC14. Since, Mobile Network 702 has recalculated HMAC24 it may solve for H8⊕H9, as H8⊕H9=(HMAC (key 24, CH4||time)⊕H8⊕H9)⊕HMAC$_{rc}$, with the value of (HMAC(key 24, H4||time)⊕H8⊕H9) being obtained from the MAC field 755b of 3GPP-Protected-AVP 755.

Mobile Network 702 may then verify HMAC14 in the MAC field 751b of 3GPP-Protected-AVP 751 in the same manner as described above in reference to FIG. 7A, as Mobile Network 702 now has the value H8⊕H9. If the MAC field 751b is verified to be correct, Mobile Network 702 can conclude that the Diameter message 750 was not modified during transit from Mobile Network 701 to IPX Provider 710 and that Mobile Network 701 is the entity that created the Diameter message 750. And because the verification of HMAC14 was based on the verification of HMAC24, Mobile Network 702 can also conclude that the Diameter message 750 was not modified during transit from IPX Provider 710 to Mobile Network 702. Further Mobile Network 702 can conclude IPX Provider 710 is the entity that deleted AVP8 and AVP9 because IPX Provider 710 and Mobile Network 702 are the only entities with the access to key 24. Additionally, if the timestamp was used, Mobile Network 702 is able to confirm when the original message was sent from Mobile Network 701 and when the modified message with the deleted AVPs was sent from IPX Provider 710 to ensure that it is not being "replayed" or resent by a bad actor performing some type of replay attack.

Figure 11:
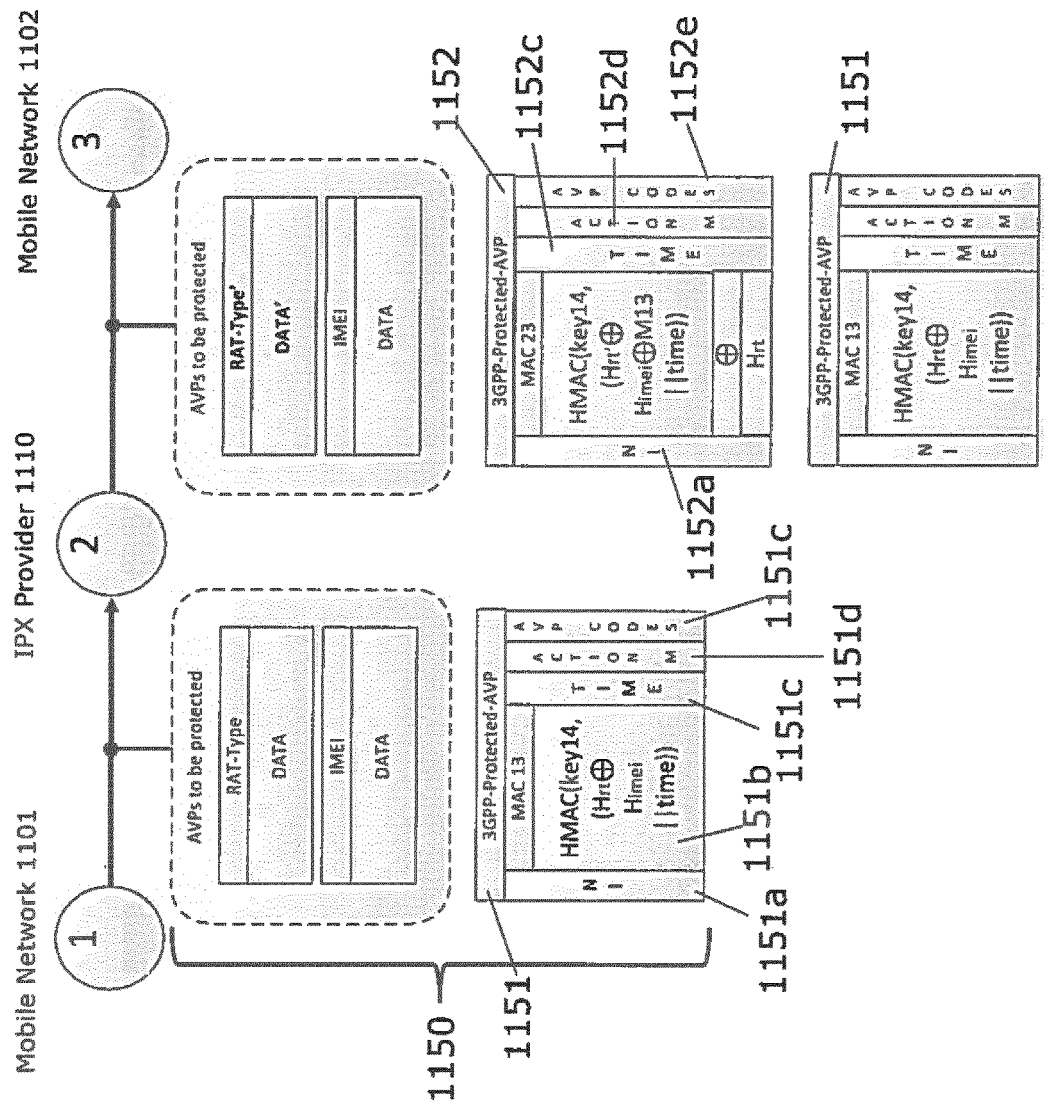
FIG. 11 illustrates an example embodiment where an AVP in a Diameter message is modified by an IPX Provider while the message is transmitted between mobile networks.

FIG. 11 illustrates an example embodiment where an AVP in Diameter message 1150 is modified by IPX Provider 1100 while the message is transmitted between Mobile Network 1101 and Mobile Network 1102. This example embodiment is similar to the one described and illustrated in FIG. 9A, but instead the sender (Mobile Network 1101) protects two AVPs, one AVP being modified in transit, and there is only one IPX provider 1110 in between the sending and receiving mobile networks. Additionally, this example embodiment is illustrated using example data fields, hash values, keys, HMACs, etcetera. To improve readability, the keys, hashes, and HMACs are limited to the first 8 hexadecimal digits only. The hash and HMAC used in this example are SHA-256.

As in the above described example embodiments, the network indicator field 1151a indicates which entity created the 3GPP-Protected-AVP 1151. For this example, the following Network Indicators are assigned.

TABLE 4

Network indicators

| Entity | Network Indicator |
|---|---|
| Mobile Network 1101 | 513 |
| IPX Provider 1110 | 7BB |
| Mobile Network 1102 | 270F |

For this example the AVPs in Diameter message 1150 have the following names, codes, and SHA 256 hash values.

TABLE 5

3GPP-Protected-AVP SHA-256 hash values

| AVP Name | AVP code | SHA 256 hash |
|---|---|---|
| RAT-Type | 408 | 11b1b19b . . . |
| IMEI | 57A | 42f936f2 . . . |

For this example, the date and time 3GPP-Protected-AVP 1151 was created is 18th of September 2016, 11:32:01 UTC, which is a coded as 57 DE 5F 82.

The secret keys that are relevant for this example are the symmetric keys between Mobile Network 1101 and Mobile Network 1102 and the one between IPX provider 1110 and Mobile Network 1102.

TABLE 6

Secret key between entities

| Secret Key between | 256-bite key |
|---|---|
| Mobile Network 1101 Mobile Network 1102 | 8ac56bfc . . . |
| IPX provider 1110 Mobile Network 1102 | f0e982a0 . . . |

According to this example embodiment. Mobile Network 1101 creates the Diameter message 1150 and protects two AVPs (RAT-Type and IMEI) with the 3GPP-Protected-AVP 1151. FIG. 12A shows an example of the content of 3GPP-Protected-AVP 1151, excluding the header, flags and length field.

The MAC13 value (located in MAC Field 1151*b*) is calculated in similar manner as described above with reference to FIG. 9A A XOR operation is used to combine the hash values of the two AVPs (RAT-Type and IMEI) with the time stamp appended. The result is then HMACed with key K, as shown below.

MAC13=HMAC_SHA256 (K,(hash(AVP1)⊕(hash(AVP2))∥time));

hash(AVP1)⊕hash(AVP2)∥time=11bb19b⊕42f936f2∥57de5f82=5348876957de5f82;

MAC13=HMAC_SHA256 (8ac56bfc,5348876957de5f82)=c788e24e.

According to this example embodiment, upon receiving the Diameter message 1150 from Mobile Network 1101, IPX provider 1110 wishes to modify the RAT-Type AVP. IPX provider 1110 determines based on the AVP codes in the AVP codes field 1155*e* of the 3GPP-Protected-AVP 1151 that RAT-Type is a protected AVP. IPX provider 1110 then modifies RAT-Type by giving it a new value, leading to a different hash value.

TABLE 7

Different hash value from RAT-Type

| AVP Name | AVP code | SHA-256 hash |
|---|---|---|
| RAT-Type (old) | 408 | 11b1b19b |
| RAT-Type (new) | 408 | fcede1d2 |

According to this example embodiment, IPX provider 1110 creates a new 3GPP-Protected-AVP 1152 that is placed on top of the existing 3GPP-Protected-AVP 1151. FIG. 12B shows an example of the content of 3GPP-Protected-AVP 1152, excluding the header, flags and length field.

The MAC23 value (located in MAC Field 1152*b*) is calculated as the XOR between the two hash values of the AVPs (with the new hash value of the modified AVP (hash(AVP2')) XORed with the previous MAC13 (M13) with the time appended. The result is then HMACed with key K23, as shown below:

MAC23=HMAC_SHA256(K23. (hash(AVP1')⊕(hash(AVP2))⊕M13∥time))⊕hash(AVP1);

hash(AVP1')⊕hash(AVP2)⊕M13∥time=fcede1d2G42f936f2c788e24e∥57de5f82=799c356e57de5f82;

HMAC_SHA256 (f0e982a0,799c356e57de5f82)=942ad0eb;

942ad0eb⊕11b1b19b,859b6170.

According to this example embodiment, Mobile Network 1102 receives the Diameter message 1150 with the two 3GPP-Protected-AVPs 1151 and 1152. Mobile Network 1102 then confirms the authenticity and integrity as outlined below.

TABLE 8

Protected-AVP SHA-256 hash values received by Mobile Network 1102

| AVP Name | AVP codes | SHA 256 hash |
|---|---|---|
| RAT-Type | 408 | fcede1d2 . . . |
| IMEI | 57A | 42f936f2 . . . |

According to this example embodiment, Mobile Network 1102 looks up the correct symmetric key (key K23) based on the network indicator (7BB), which indicates IPX Provider 1110. Mobile Network 1102 performs a XOR operation with the hash values of AVP1', AVP2 and M13, and appends the timestamp from the timestamp field 1152*c*.

hash(AVP1')⊕hash(AVP2)⊕M13∥time=fcede1d2⊕42f936f2⊕c788e24e∥57de5f82=799c356e 57de5f82.

According to this example embodiment, Mobile Network 1102 then HMACs this value with the corresponding key K23:

HMAC_SHA256 (f0e982a0,799c356e57de5f82)=942ad0eb.

According to this example embodiment, Mobile Network 1102 then solves for the hash value of the original AVP1 (RAT-Type) hash value:

942ad0eb⊕859b6170=11b1b19b.

After solving for the hash value of the original AVP2 (provided that the message was not tampered between IPX Provider 1110 and Mobile Network 1102), Mobile Network

1102 is able to recalculate the MAC13 in the MAC field 1151b of 3GPP-Protected-AVP 1151 as follows:
hash(AVP1)⊕hash(AVP2)
||time=11b1b19b⊕42f936f2||57de5f82=5348876957de5f82;
HMAC_SHA256 (8ac56bfc,5348876957de5f82)=c788e24e.

Mobile Network 1102 is then able to confirm that Diameter message 1150 was not tampered with during transit between Mobile Network 1101 and Mobile Network 1102 because the MAC13 that Mobile Network 1102 recalculated matches the MAC13 in the MAC field 1151b.

The example embodiments as shown in FIGS. 7A-11 and described above may occur simultaneously in the same Diameter message when it travels across the IPX network, or the same scenario, for instance modifying an AVP in transit, can happen subsequently. The receiver of the Diameter message should always be able to work back to the original hashes of the original AVPs by analyzing the 3GPP-Protected-AVP fields in the correct order. Additional rules apply when an intermediate node needs to do more than one operation. In that case the order of processing is addition, modification and deletion of AVPs. The receiver then needs to determine the integrity by analyzing the generated 3GPP-Protected-AVP fields in the reverse order (deletion, modification and addition).

In the example embodiments described above an HMAC scheme is utilized to prevent unauthorized modifications to or a spoofed version of a Diameter message. One of skill in the art would recognize there are many different HMAC schemes that would work for embodiments of this disclosure. For example, HMAC-SHA256 s not vulnerable to a length extension attack, is computationally fast and provides a limited overhead to the Diameter application. Both HMAC and SHA256 are, as of December 2016, secure. The length of the key is also an important aspect. RFC 4868 (S. Frankel and S. G. Kelly, "Using HMAC-SHA-256, HMAC-SHA-384, and HMAC-SHA-512 with IPsec," No. 4868. RFC Editor, 2015 (herein incorporate by reference)) recommends a key in the range of the output of the hash, in this case 256 bits long. The use of HMAC-SHA256 is only an example.

Embodiments of the present disclosure provide flexibility to extend the key length as well as an option to change the hashing algorithm. SS7 has existed for over 40 years and it is foreseeable that what is specified for Diameter could be around for decades Therefore, the representation of a 3GPP-Protected-AVP must allow for possible changes to the hashing and HMAC algorithms without changing the core specification.

Embodiments of the present disclosure may involve the creation of a new type of AVP, referred to herein as a 3GPP-Protected-AVP. The 3GPP-Protected-AVP is added by any entity that adds, modifies or deletes protected AVPs. For example, the 3GPP-Protected-AVP may be an Octet string type, have a variable length and the following structure:

TABLE 9

| \multicolumn{6}{c}{3GPP-Protected-AVP high-level structure} |
| --- | --- | --- | --- | --- | --- |
| Network Indicator | Algorithm | Message Authentication Code (MAC) | Timestamp | Action | AVP Code |
| 32-bit | 8-bit | 256/384/512-bits | 32-bit | 8-bit | 32-bit |

A 3GPP-Protected-AVP may contain a network indicator field that is used in several embodiments of the present disclosure. The 3GPP-Protected-AVP may have an algorithm field indicating hashing and HMAC algorithm that was used. Next, the 3GPP-Protected-AVP may have a MAC field which contains an HMAC created with a key that can be selected based on the Network Indicator field. Further, the 3GPP-Protected-AVP may have a timestamp field, an action field and an AVP Codes field that has a list of AVP that were affected by the corresponding action indicated in the action field.

TABLE 10

| \multicolumn{3}{c}{3GPP-Protected-AVP detailed structure} |
| --- | --- | --- |
| Name | Mandatory | Description |
| Network Indicator | M | A 32-bit octet string indicating the network, by its Mobile Country Code and Mobile Network Code issued by the GSMA. Needs to be published in the administrative document of the LTE roaming operator, the IR.21. |
| Algorithm | M | A 32-bit octet string to indicate the hash and HMAC algorithm: 00 means SHA-256 01 means SHA-384 02 means SHA-512 03 means SHA3-256 04 means SHA3-384 05 means SHA3-512 The list is extendable. |
| Message Authentication Code (MAC) | M | A 256/384/512-bit octet string representing an HMAC or the HMAC XORed with one or more hashes. The size and type can be determined from the algorithm field 1) In the case that the action is adding one or more AVPs, this field contains the individual hashes of all AVPs that need to be protected (including the AVPs that one is adding) XORed with each other and with the Unix time (coded in four octets) appended. This value is HMACed with the key determined by the network indicator. 2) In the case that the action is modifying one or more AVPs, this field contains the individual hashes of all AVPs that need to be protected (including the AVPs that one has modified) XORed with each other and with the Unix time |

TABLE 10-continued

3GPP-Protected-AVP detailed structure

| Name | Mandatory | Description |
|---|---|---|
| | | (coded in four octets) appended. This value is HMACed with the key determined by the network indicator. Finally the HMAC value is XORed with the hash of a single modified AVP or the XOR of multiple hashes of modified AVPs. |
| | 3) | In the case that the action is deleting AVPs, this field contains the individual hashes of all AVPs that need to be protected XORed with each other and with the Unix time (coded in four octets) appended. This value is HMACed with the key determined by the network indicator. Finally the HMAC value is XORed with the hash of a single deleted AVP or the XOR of multiple hashes of deleted AVPs. |
| | | A 3GPP-Protected-AVP must be added on top of any existing 3GPP-Protected-AVP. The MAC of the current topmost 3GPP-Protected-AVP needs to be included in the XOR operation between the hashes and timestamp so that the 3GPP-Protected-AVPs are protected against unauthorized deletions. |
| Timestamp | M | Timestamp is in the Unix format, in seconds, coded in four octets, 32-bits. UTC time is used. The timestamp is used in order to recalculate the HMAC by the receiver. |
| Action | M | 00 means adding, 01 means modification, 02 means deletion. If multiple actions need to added by the same node, the other is first adding, second modification and third deletion. |
| AVP Code | M | A 32-bit octet string indicating the one or more AVPs by AVP Code that are being added, modified or deleted. This field may occur more than once if several AVPs need to be addressed. |

Embodiments of the present disclosure may be implemented on numerous network elements involved in creating, transmitting and receiving Diameter messages. For example, the Diameter Edge Agent (DEA) could be used. The DEA may be considered a secure gateway/proxy via which all inter-network Diameter traffic will be sent One of the main tasks of the DEA is hiding the topology hiding and screening measures. It is up to the mobile network operator to determine to what extent screening rules are implemented, as the rules are not mandatory. The DEA can be deployed as a stand-alone node or separate function in a 3GPP network, but in most cases, the DEA co-located with a Diameter Routing Agent (DRA) In that case, the minimum requirement to implement embodiments of the present disclosure is the possession of a DEA or DRA, a network element that nearly all mobile networks and IPX providers possess. The DEA must support the implementation of the proposed solution. In practice this means that DEA vendors must update their software to support this functionality.

In order for the entity receiving a Diameter message to judge its authenticity and integrity, there must be an agreement on which fields are protected and get the status of a "Protected AVP." The content of fields in the Diameter base protocol that change on a hop-by-hop basis makes little sense to protect. Looking at an application, (e.g., the 3GPP S6a application), it makes sense to protect the entire application layer. In the majority of the cases, the content of the application layer remains unchanged, as intermediate hops do not need access to the application layer with the exception of the scenarios where intermediate nodes have a need to change the existing AVPs. The application fields are clearly marked since the Vendor-Specific bit is set to 1. However, the most important field, the identifier of the subscriber (IMSI), is set in the "User-Name" field of the Diameter protocol. This field is expected to be the most common field subject to modification and needs to be a protected AVP.

If an IPX provider provides data services to a mobile network operator on the receiving side of a Diameter message, the mobile network operator that sends the Diameter message does not know that the IPX provider is changing fields on behalf of the receiving mobile network to perform some kind of a data service. This makes implementing end-to-end encryption challenging as the sender of the Diameter message has no clue who needs access to which field. In contrast, the receiving mobile network usually does know who is allowed to change fields in the Diameter message. Embodiments of the present disclosure enable a mobile network to judge authenticity and integrity "as it happens" and therefore provide a quick and flexible approach. Below is one example of how mobile network operator could implement an embodiment of the present disclosure.

Provided that the entire application layer of a Diameter protocol message is protected, it makes sense that the default rule is that no fields may be changed in transit, this after al is the most common scenario. This means that one would only need to configure the exceptions. An approach could be on an AVP basis for the 3GPP S6a application which is outlined in Table 11.

TABLE 11

Per AVP screening rules

| Application-ID | 16777251 (3GPP - S6a/S6d interface) | |
|---|---|---|
| AVP Code | Network Indicator | Actions |
| 1 (User-Name) | 7BB | M |
| 1032 (RAT-Type) | 7BB | M |
| 1032 (RAT-Type) | 7BC | A-M-D |

For any other fields, authenticity and integrity will be checked by the network indicator that belongs to the "Origin-Realm." When receiving traffic from a certain mobile network operator, authenticity and integrity is furnished in the application and the mobile network operator needs to take action when the message contains no Protected-AVP fields as this could indicate a spoofing attempt.

When judging the authenticity and integrity the DEA needs to take action when the authenticity and integrity check fails. Mobile network operators should proceed with caution when responding to unauthenticated messages, because if the goal of the attacker is to perform a DoS attack by actually attacking the security protocol itself, it makes more sense to trigger alarms rather than dropping the message. The conscious choices of the mobile network operator depend on the threat landscape and corresponding risk, but embodiments of the present disclosure have flexibility and include multiple different actions, such as ignore, alarm, drop or alarm+drop. Sending many false Diameter messages may be an indication of a DoS attack, in particular if there is also a response to inform the sender. Thus, a mobile network operator must consider the threat landscape when deciding which action to take in response to an unauthenticated message.

A suspected integrity breach may only be a mismatch with the timestamp. Either calculating the HMAC failed because the inner HMAC timestamp does not match the outer HMAC timestamp or because the time is out of sync of what can reasonably expected. Mobile network operators often expect to get an answer for a request in 8 seconds. There should be an agreement between mobile network operators and IPX providers on a common setting of this timer that is individually set in networks currently. An example threshold for a single message to go across from the DEA of one network to the other may be 8 seconds for a request and 6 seconds for a response.

In the case where the message is dropped, the sender of the message may be notified. The sender identified in the "Origin-Realm" win be notified by a Diameter Result code, which is the standardized way of letting the sender know if a certain operation has succeeded or failed and the reason behind it.

Embodiments of the present disclosure may use the result codes In Table 12.

Embodiments of the present disclosure may rely on proper key management (i.e., maintaining the secrecy of shared keys between entities transmitting and receiving Diameter messages in the IPX ecosystem). If there is poor key management and the keys are leaked, every protocol message may be rendered insecure. Example key generation embodiments are described below using HMAC-SHA-256 with a 256-bit key K, however it is understood that extending the key length or changing the algorithm would also be acceptable.

As stated above, embodiments of the present disclosure may be implemented by the Diameter Routing Agent (DRA), or to be more precise the Diameter Edge Agent (DEA) within the DRA of a network. The DRA is the point of egress and ingress for all inter-network Diameter messages. Some embodiments utilize a symmetric key between nodes or networks in order to calculate integrity.

Mobile network operators and IPX providers have multiple DRAs, both for redundancy and load sharing purposes. Having a symmetric key between each DRA-DRA relation between the two networks is undesired. Instead, embodiments of the present disclosure may only require a symmetric key between two mobile networks. Although the same shared secret will be used as the key between all DRAs of the two networks, the two networks are unaware of each other's topology. To avoid regenerating a new shared secret between all involved DRAs (including the 300 plus remote sides at the same exact moment) as a result of introducing a new DRA by one of the two operators, according to some embodiments, networks may add DRAs on the local side without renegotiating instantly a new shared secret on the remote side. Furthermore, some embodiments include ways to regenerate a shared secret on a regular scheme and make sure that the symmetric key is authentic. This ensures all the nodes that join in generating the shared secret are authentic.

According to some embodiments of the present disclosure, HMACs may be used with a symmetric key. As stated above, networks may be unaware of the amount of DRAs nodes on other networks, so the entire relationship between

TABLE 12

Diameter result codes

| Result Code | Description |
| --- | --- |
| DIAMETER_NI_UNKNOWN | Permanent failure to indicate that the NI is unknown, or no key belongs to the NI |
| DIAMETER_INTEGRITYCHECK_EXPECTED | Permanent failure to indicate that AVPs from this Origin-Realm should be integrity checked but the Protected-AVP field is missing. |
| DIAMETER_INTEGRITYCHECK_FAILED | Permanent failure to indicate that the integrity check has failed |

The sender of a Diameter message only receives a Diameter result code if the receiver detected an integrity problem and decided to not process the Diameter message. Again, caution should be taken by the receiver. If the receiver suspects a DoS attack it should obviously not respond to those messages. But if there is an integrity problem that has nothing to do with a DoS attack it should be standardized what is the accepted behavior of the sender when these Diameter result codes are received. For example, the Diameter result codes may indicate permanent failures, and retries will only occur if a network element or a handset retries the procedure.

two networks needs to rely on a single symmetric key. In some embodiments, networks may utilize a Diffle-Helman key-exchange scheme where only one selected node in each network communicates with one selected node in another network, where all nodes yield to the same shared secret.

Figure 13:
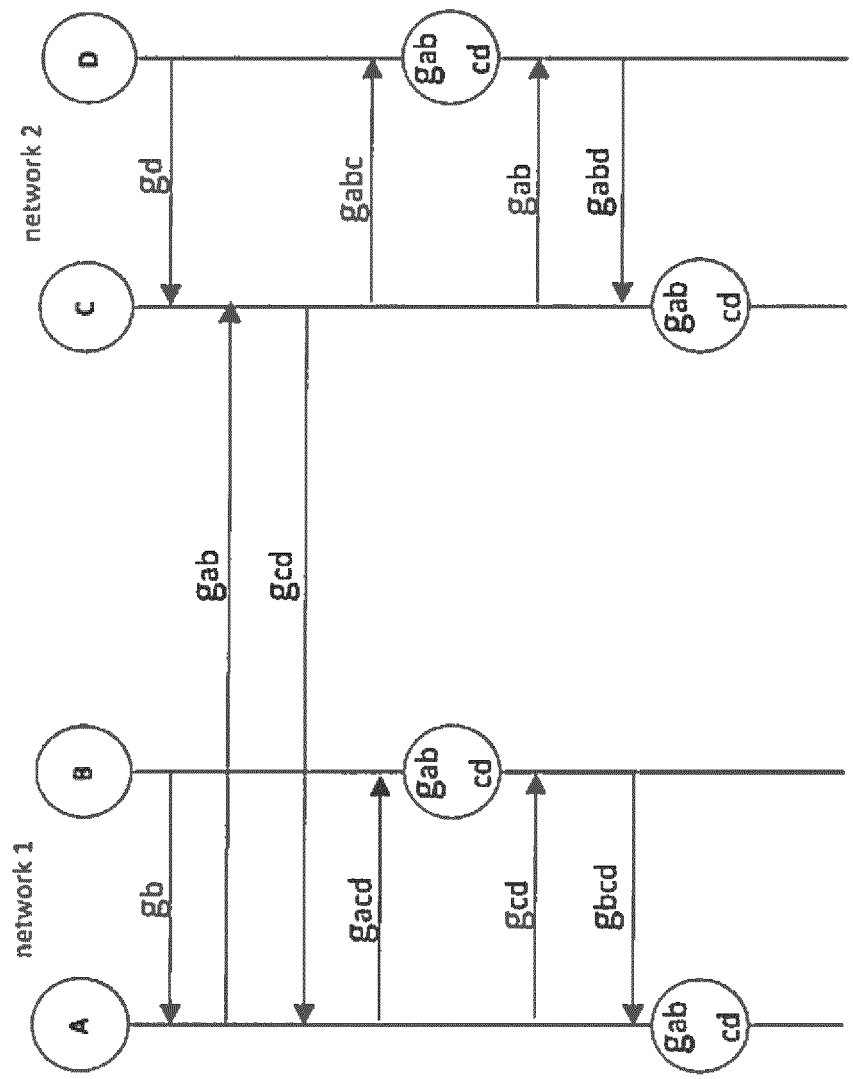
FIG. 13 illustrates an example key exchange between two mobile networks.

For example, the entire IPX ecosystem can agree upon a common p and g, which are public numbers in the Diffie-Hellman key-exchange According to the example key exchange illustrated in FIG. 13, Network 1 has nodes A and B, and Network 2 has nodes C and D. A and C are the nodes that deal with inter-network communication.

An example scheme to generate key K is as follows:

TABLE 13

Example DH-key-exchange (all steps modulo P)

| Step | Network 1 | Network 2 |
|---|---|---|
| 1 | B computes $g^b$ and sends it to A | D computes $g^d$ and sends it to C |
| 2 | A computes $(g^b)^a = g^{ab}$ and sends it to C | C computes $(g^d)^c = g^{cd}$ and sends it to A |
| 3 | A computes $(g^{cd})^a = g^{acd}$ and sends it to B | C computes $(g^{ab})^c = g^{abc}$ and sends it to D |
| 4 | B computes $(g^{acd})^b = g^{acd}$ and uses it as key K | D computes $(g^{abc})^d = g^{abcd}$ and uses it as key K |
| 5 | A sends $g^{cd}$ to B | C sends gab to D |
| 6 | B computes $(g^{cd})^b = g^{bcd}$ and sends it to A | D computes $(g^{ab})^d = g^{abd}$ and sends it to C |
| 7 | A computes $(g^{bcd})^a = g^{abcd}$ and uses it as key K | C computes $(g^{abd})^c = g^{abcd}$ uses it as key K |

According to this example, key K is in fact not the shared secret, but the SHA-256 hash of the secret to ensure the result is 256 bits. Further, the only inter-network exchange is done in step 2, all the other exchanges are intra-network in order to derive to the same key.

Due to the flexibility of the Diffie-Hellman protocol, it is also possible to have other dimensions of intra-network and inter-network relations for instance, a key-exchange between 2 networks where 1 network has 2 nodes and 1 network has 3 nodes or between 3 networks, each having 2 nodes, etcetera. The number of messages and the order becomes more complex when the amount of nodes or networks grows. In practice, the common amount of networks is two and the common amount of nodes is two, the maximum four.

In order to avoid brute force attacks from an attacker attempting to obtain the key, the procedure to generate the key may be repeated on a fixed time scheme. Brute forcing a truly random 256-bit key is very hard in practice, if not impossible. Therefore, the time to renegotiate the key may be limited to, for example, 24 hours. Also, for a limited period of time (e.g., 10 seconds) both the old and the newly generated key are valid to avoid the key rollover causing messages to be dropped.

According to some embodiments, all nodes involved in the key exchange may use random numbers for each private number generated with a Cryptographically Secure Pseudo Random Number Generator (CSPRNG). If the private numbers used by the nodes are predicable, the shared secret K would be easier to predict.

As described above, there is a need for a procedure to introduce new nodes within a network without this leading to the regeneration of a new shared secret with al (300+) networks. Two example embodiments are described below.

The first example embodiment enables any potential new nodes to be part of the generation of the shared secret key from the beginning. The second example embodiment involves a procedure to let the new node calculate the shared secret key without being part of the calculation initially. Both example embodiments have only intra-network implications if the Diffie-Helman procedure is executed in a similar fashion as described above.

In the first example embodiment any redundant node that has the potential to become part of the exchange between the two networks needs to be involved in generating the shared secret key regardless of whether the node actually takes traffic.

Figure 14:
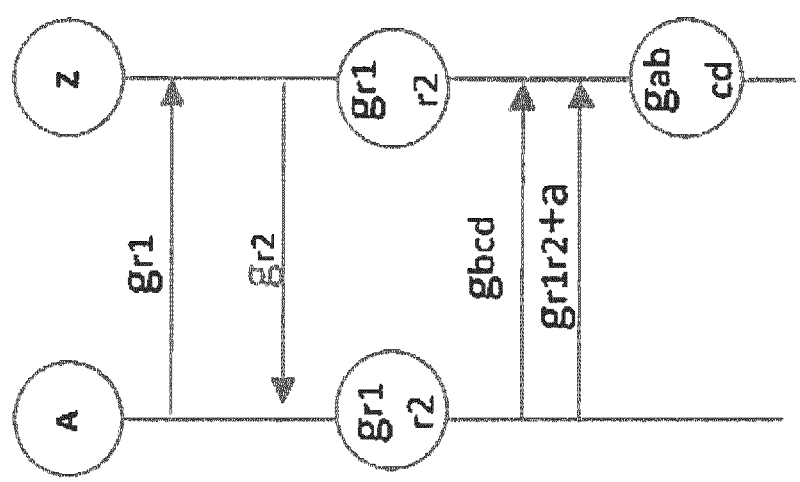
FIG. 14 illustrates how a redundant node may become part of the "shared secret" without receiving the "shared secret" in public.

In the second example embodiment, which is illustrated in FIG. 14, a redundant node may become part of the shared secret without receiving the shared secret in pubic. FIG. 14 introduces node Z in network 1, (network 1 already contains nodes A and B). Node Z starts a new Diffie-Hellman key-exchange with either Node A or B. If Node A is selected, then Node A generates a new random private number r1 and Node Z generates r2. The exchange of r1 and r2 leads to a shared secret $g^{r1r2}$. Now for Node Z to calculate the shared secret $g^{abcd}$, it needs the secret number ("a") of Node A, and it needs $g^{bcd}$. The latter may be sent in public; however the secret number of Node A needs to be masked. In order to do so, Node A sends $g^{r1r2+a}$ and since Node Z knows $g^{r1r2}$, it is able to subtract $g^{r1r2}$ and determine "a" and subsequently $g^{abcd}$. A man-in-the-middle is unable to determine $g^{r1r2}$ and therefore unable to determine "a."

The Diffie-Helman key-exchange may be vulnerable to a man-in-the-middle attack. For example, when Node A and B exchange their public values $g^a$ and $g^b$, an attacker could sit in the middle pretending to be Node A from the perspective of Node B and Node B from the perspective of Node A. In this case, the attacker could then create 3GPP-Protected-AVPs, it use that ability to improperly modify Diameter messages exchanged between Node A and B.

To prevent this from happening, some embodiments use Ephemeral Diffie-Helman. Ephemeral Diffie-Helman s used in Transport Layer Security (TLS) Protocol and may be used in combination with RSA or with the Digital Signature Standard (DSS). See FIPS PUB 186-4, Digital Signature Standard (DSS), Federal Information Processing Standards Publication, July 2013 (herein incorporated by reference). It is not possible to apply exactly what is specified in the TLS standard, which describes a two-way handshake. According to some embodiments, Diffie-Helman is used within groups, there is no handshake between two parties, but information is exchanged between a number of parties where the sender needs to be authenticated.

In some embodiments, whenever a node is sending Diffie-Hellman public values the node will add other parameters in a single message. For example, the message may include the digital certificate containing the pubic key together with the chain of route certificates, the public value of Diffle-Hellman, and a signed version of the hash of the public value of Diffie-Hellman signed with the private key, belonging to the public key in the certificate. Some embodiments follow the recommendation of TLS to add random values before signing so that attackers cannot replay old parameters. With the mentioned measures, a man-in-the-middle attacker could still intercept values of $g^a$ and $g^b$, but would not be able to send values without the corresponding private key of a public key of a valid certificate.

Diameter can be used to exchange the information of Diffie-Helman and RSA. In Table 14 the contents of an example Diameter message is outlined.

TABLE 14

Diameter message to exchange DH information

| Digital Certificate | DH parameters | RSA signature |
|---|---|---|
| Public key, issuer etc. | e.g. $g^a$ p and g | Hash(DH parameters) + random value |

According to some embodiments, a Public Key Infrastructure (PKI) is used to validate that a certain public key does in fact belong to a certain node or network. Some embodiments rely on existing PKI approaches with a number of rational choices. The PKI does not need to be a public PKI. The GSMA governs the IPX ecosystem which is a private ecosystem. From this perspective the GSMA can function as the Route Certificate Authority (CA). In practice however it is often better to use a trusted third party to run it rather than the GSMA itself.

All nodes that are required to take part in securing integrity and authenticity in the IPX ecosystem, that is all Diameter Routing Agents, require certificates. For example, the common X.509 format may be used for the PKI infrastructure and for the certificates.

Figure 15:
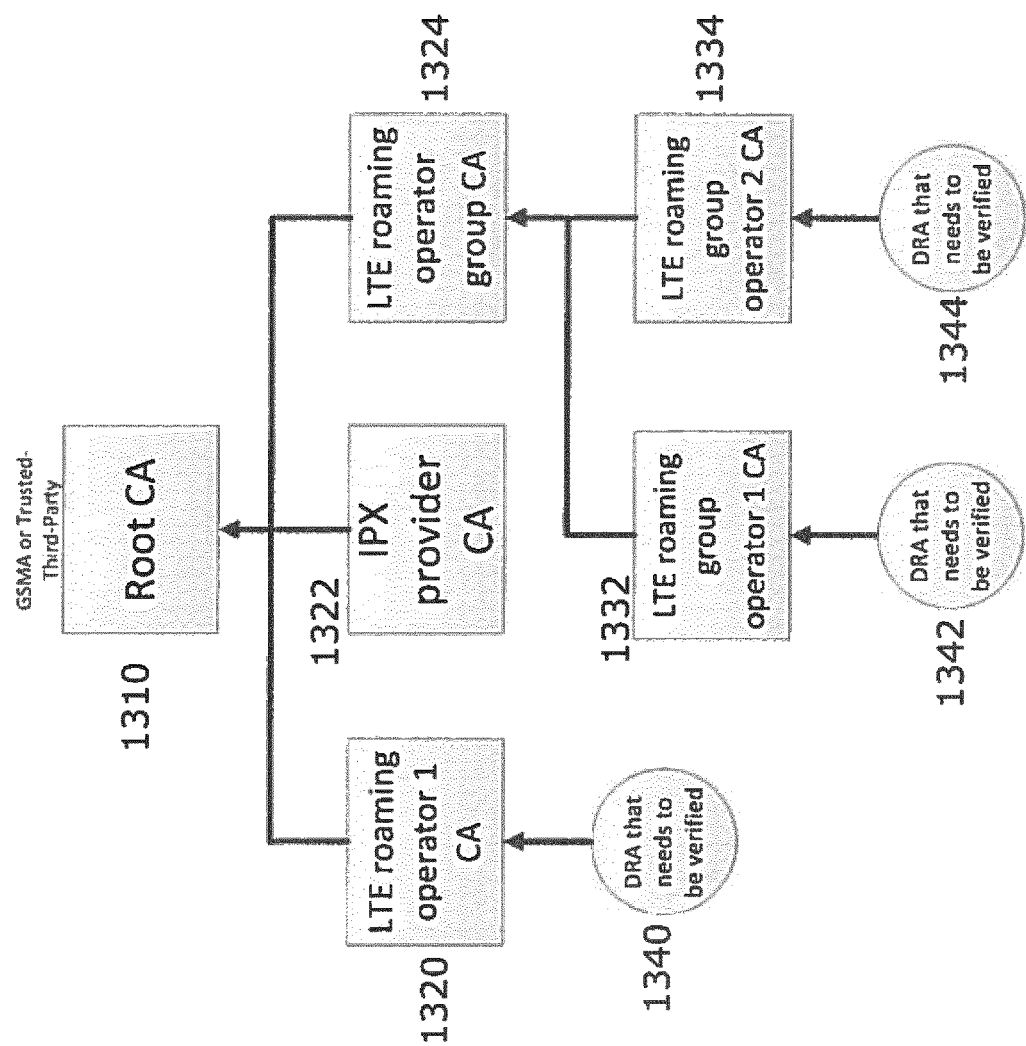
FIG. 15 illustrates an example Public Key Infrastructure (PKI) chain.

According to the example PKI chain illustrated in FIG. 15, the root CA 1310 is on the top of the chain, underneath are the mobile network operator CA 1320, IPX provider CA 1322 and mobile network operator group CA 1324. The chain works as a general PKI. Intra-network authentication will be validated by the mobile network operator CA 1320, since all nodes within the mobile network operator trust the operator CA 1320. Inter-network nodes will be validated by the root CA 1310, provided that the network operators do not trust each other's CA.

Since the PKI is a chain of trust, an extra layer can be made for instance by mobile network operator group CA 1324, which may be a group of mobile network operators that trust each other, for instance, mobile network operator 1332 and mobile network operator 1334. If a key from a node is revoked it will be placed in the Certificate Revocation List (CRL), like with any PKI the list is issued and interrogated on intervals. In the case a private key of a node is compromised the node may not be part of the secure ecosystem until it has generated a new public/private key pair and has obtained a certificate for the public key.

The cyber security of the IPX ecosystem and its legacy predecessor leaves things to be desired when it comes to integrity and confidentiality. The embodiments of the present disclosure provide a solution for integrity problems. Mobile network operators that mutually trust each other can benefit from the solution without interfering with the economic interest of IPX providers in the IPX ecosystem.

FIG. 16 shows example AVPs with mandatory fields from an "Update Location Request" Diameter message. These example AVPs could be added to the top of the base protocol. If the Vendor-Specific bit is set and there is an AVP vendor ID present, then the AVP vendor IDs and the application ID need be unique and registered with IANA. The meaning of the AVP code is then further specified in vendor specific documentation. In this particular example AVP 1401, 1402 and 1403 are so called grouped AVPs, as AVP 1402 and 1403 are nested inside the terminal information field of AVP 1401. The IMEI in this example has been obfuscated.

Figure 17:
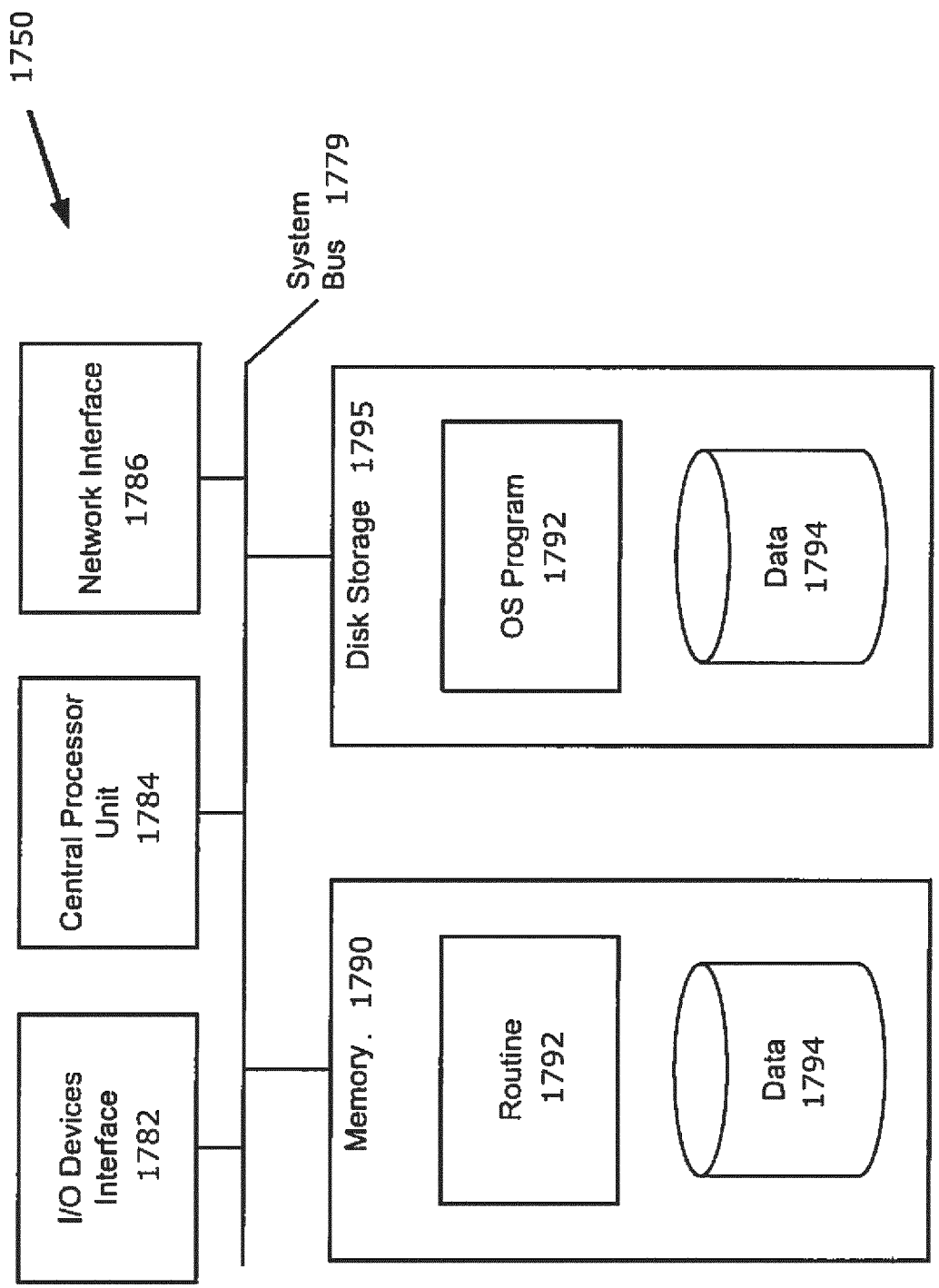
FIG. 17 is a block diagram of the internal structure of a computer in which various embodiments of the present invention may be implemented.

FIG. 17 is a block diagram of the internal structure of a computer 1750 in which various embodiments of the present invention may be implemented. The computer 1750 contains a system bus 1779, where a bus is a set of hardware lines used for data transfer among the components of a computer or processing system. Bus 1779 is essentially a shared conduit that connects different elements of a computer system (e.g., processor, disk storage, memory, input/output ports, network ports, etc.) that enables the transfer of information between the elements. Attached to system bus 1779 is I/O device interface 1782 for connecting various input and output devices (e.g., keyboard, mouse, displays, printers, speakers, etc.) to the computer 1750. Network interface 1786 allows the computer 1750 to connect to various other devices attached to a network. Memory 1790 provides volatile storage for computer software instructions 1792 (e.g., instructions for the processes 700 of FIG. 78, 730 of FIG. 7C, and/or 800 of FIG. 8B) and data 1794 used to implement an embodiment of the present invention. Disk storage 1795 provides non-volatile storage for computer software instructions 1792 and data 1794 used to implement an embodiments of the present disclosure. Central processor unit 1784 is also attached to system bus 1779 and provides for the execution of computer instructions.

In one embodiment, the processor routines 1792 (e.g., instructions for the processes 700 of FIG. 78, 730 of FIG. 7C, and/or 800 of FIG. 8B) and data 1794 are a computer program product (generally referenced 1792), including a computer readable medium (e.g., a removable storage medium such as one or more DVD-ROM's, CD-ROM's, diskettes, tapes, etc.) that provides at least a portion of the software instructions for the invention system. Computer program product 1792 can be installed by any suitable software installation procedure, as is well known in the art. In another embodiment, at least a portion of the software instructions may also be downloaded over a cable, communication and/or wireless connection.

Further, the present invention may be implemented in a variety of computer architectures. The computer of FIG. 17 is for purposes of illustration and not limitation of the present invention. In some embodiments of the present disclosure, a network element located on a sending mobile network, a transporting mobile network, or a receiving mobile network may function as a computer to perform aspects of the present disclosure. These network elements may be DRAs and/or DEAs.

It should be understood that the example embodiments described above may be implemented in many different ways. In some instances, the various methods and machines described herein may each be implemented by a physical, virtual or hybrid general purpose computer having a central processor, memory, disk or other mass storage, communication interface(s), input/output (I/O) device(s), and other peripherals. The general purpose computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., which enables the transfer of information between the elements. One or more central processor units are attached to the system bus and provide for the execution of computer instructions. Also attached to system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a non-transitory computer-readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

In order to make a significant change towards a more secure IPX ecosystem, participants in the IPX ecosystem must be forced to perform an integrity check on each incoming Diameter message. 5G is in the standardization phase and Diameter is the most likely candidate for core network signaling including the signaling of roaming exchange. If standardization will reach a point that a message that is not integrity checked is invalid then the cyber security in the signaling roaming exchange will finally reach a significant step forward.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

The invention claimed is:

1. A system for sending signaling messages to a transporting network, the system comprising:
a network element located on a sending mobile network, the network element comprising a processor configured to:
generate a signaling message that includes one or more protected data fields,
calculate a hash value for each of the one or more protected data fields,
combine each of the calculated hash values together using an exclusive OR (XOR) operation resulting in a combined hash value,
calculate an authentication code based on the combined hash value and a key, wherein the key is an asymmetric key including a public key and a private key,
add an authentication field to the signaling message, the authentication field including the authentication code, and
send the signaling message to the transporting network.

2. The system of claim 1 wherein the network element is a Diameter routing agent or a Diameter edge agent and the signaling message is a Diameter message.

3. A system for sending signaling messages to a transporting network, the system comprising:
a network element located on a sending mobile network, the network element comprising a processor configured to:
generate a signaling message that includes one or more protected data fields,
calculate a hash value for each of the one or more protected data fields,
combine each of the calculated hash values together using an exclusive OR (XOR) operation resulting in a combined hash value,
calculate an authentication code based on the combined hash value and a key,
add an authentication field to the signaling message, the authentication field including the authentication code, and
send the signaling message to the transporting network,
wherein the processor is further configured to append a timestamp to the combined hash value and calculate the authentication code based on the combined hash value with the appended timestamp and the key.

4. A system for modifying a signaling message, the system comprising:
a network element located on a transporting mobile network, the network element comprising a processor configured to:
receive the signaling message that includes one or more protected data fields and a first authentication field, the first authentication field including a first authentication code,
calculate a hash value for each of the one or more protected data fields,
select at least one of the calculated hash values,
combine each of the selected calculated hash values and the first authentication code together using an exclusive OR (XOR) operation resulting in a combined value,
calculate a second authentication code based on the combined value and a key,
add a second authentication field to the signaling message, the second authentication field includes the second authentication code, and
send the signaling message to a receiving network, wherein the processor is further configured to:
delete at least one of the one or more protected data fields, and
combine each of the calculated hash values that were not selected and the second authentication code together using a XOR operation resulting in a second combined value, and wherein the added second authentication field includes the second combined value instead of the second authentication code.

5. A system for modifying a signaling message, the system comprising:
a network element located on a transporting mobile network, the network element comprising a processor configured to:

receive the signaling message that includes one or more protected data fields and a first authentication field, the first authentication field including a first authentication code, calculate a hash value for each of the one or more protected data fields, select at least one of the calculated hash values, combine each of the selected calculated hash values and the first authentication code together using an exclusive OR (XOR) operation resulting in a combined value, calculate a second authentication code based on the combined value and a key, add a second authentication field to the signaling message, the second authentication field includes the second authentication code, and send the signaling message to a receiving network, wherein the processor is further configured to:

modify at least one of the one or more protected data fields, combine each of the calculated hash values that were not selected and the second authentication code together using a XOR operation resulting in a second combined value, and wherein the added second authentication field includes the second combined value instead of the second authentication code.

6. The system of claim 4 or 5 wherein the transporting mobile network is an IPX provider that communicatively couples mobile networks in order to provide LTE or 5G data services to roaming mobile subscribers.

7. A system for authenticating signaling messages, the system comprising:

a network element located on a receiving mobile network, the network element comprising a processor configured to:

receive a signaling message that includes one or more protected data fields and an original authentication field, the original authentication field including an original authentication code, and an added authentication field, the added authentication field including an added authentication code, calculate a hash value for each of the one or more protected data fields, combine all of calculated hash values and the original authentication code together using an exclusive OR (XOR) operation resulting in a combined hash value, calculate a first confirmation authentication code based on the combined selected hash value and a key associated with a transporting mobile network, wherein the key is an asymmetric key including a public key and a private key, solve for a previous hash value, the previous hash value being a result of a XOR operation between the first confirmation authentication code and the added authentication code, select at least one of the calculated hash values, combine each of the selected calculated hash values and the previous hash value together using a XOR operation resulting in a combined selected hash value, calculate a second confirmation authentication code based on the combined selected hash value and a key associated with a sending mobile network, and authenticate the received signaling message by comparing the second confirmation authentication code to the original authentication code.

* * * * *